US010508239B2

(12) United States Patent
Inagaki

(10) Patent No.: US 10,508,239 B2
(45) Date of Patent: *Dec. 17, 2019

(54) FLAME RETARDER, FLAME RETARDANT RESIN COMPOSITION AND METHOD OF PRODUCING THE FLAME RETARDER

(71) Applicant: Sony Corporation, Tokyo (JP)

(72) Inventor: Yasuhito Inagaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,601

(22) Filed: Apr. 22, 2013

(65) Prior Publication Data

US 2013/0237668 A1 Sep. 12, 2013

Related U.S. Application Data

(63) Continuation of application No. 10/598,899, filed as application No. PCT/JP2005/004830 on Mar. 17, 2005, now Pat. No. 8,440,758.

(30) Foreign Application Priority Data

| Mar. 23, 2004 | (JP) | ................................. 2004-085477 |
| Mar. 23, 2004 | (JP) | ................................. 2004-085479 |
| Mar. 23, 2004 | (JP) | ................................. 2004-085480 |

(51) Int. Cl.
| *C09K 21/14* | (2006.01) |
| *C08G 63/688* | (2006.01) |
| *C08G 63/91* | (2006.01) |
| *C08G 64/08* | (2006.01) |
| *C08G 64/42* | (2006.01) |
| *C08L 69/00* | (2006.01) |
| *C08F 8/44* | (2006.01) |
| *C08L 25/12* | (2006.01) |
| *C08L 25/18* | (2006.01) |
| *C08L 27/18* | (2006.01) |
| *C08L 101/02* | (2006.01) |

(52) U.S. Cl.
CPC ................. *C09K 21/14* (2013.01); *C08F 8/44* (2013.01); *C08G 63/6886* (2013.01); *C08G 63/916* (2013.01); *C08G 64/081* (2013.01); *C08G 64/42* (2013.01); *C08L 69/00* (2013.01); *C08F 2800/10* (2013.01); *C08L 25/12* (2013.01); *C08L 25/18* (2013.01); *C08L 27/18* (2013.01); *C08L 101/02* (2013.01); *C08L 2201/02* (2013.01); *C08L 2205/03* (2013.01)

(58) Field of Classification Search
CPC ....... C08G 63/6886; C08F 8/36; C08L 25/12; C08J 2425/04; C09K 21/14
USPC ......................................................... 524/500
See application file for complete search history.

(56) References Cited

U.S. PATENT DOCUMENTS

| 2,764,576 | A | * | 9/1956 | Blaser | ....................... C08F 8/36 525/153 |
| 3,056,831 | A | | 10/1962 | Strartford | |
| 3,322,734 | A | * | 5/1967 | Rees | .......................... 525/328.5 |
| 3,867,319 | A | * | 2/1975 | Lundberg | .................. C08J 9/04 521/88 |
| 3,870,841 | A | * | 3/1975 | Makowski | ............. C08C 19/20 524/130 |
| 3,933,734 | A | * | 1/1976 | Mark | ....................... C08K 5/42 524/160 |
| 3,978,024 | A | | 8/1976 | Mark | |
| 4,239,678 | A | | 12/1980 | Wiliams | |
| 4,330,635 | A | * | 5/1982 | Tokas | ........................ C08J 9/08 521/147 |
| 4,391,935 | A | | 7/1983 | Bialous et al. | |
| 4,448,935 | A | * | 5/1984 | Iovine | ...................... C08F 8/36 525/343 |
| 4,563,496 | A | * | 1/1986 | Lindner | .................. C08L 25/16 524/147 |
| 5,994,423 | A | | 11/1999 | Inagaki et al. | |
| 6,602,938 | B1 | | 8/2003 | Mastoshi et al. | |
| 6,664,340 | B1 | * | 12/2003 | Karki et al. | ................ 525/333.5 |
| 6,727,312 | B1 | | 4/2004 | Nodera | |
| 6,827,882 | B1 | * | 12/2004 | Kitayama et al. | ............ 252/609 |
| 7,851,529 | B2 | * | 12/2010 | Mitsuhashi | .......... C08G 64/186 524/161 |
| 2004/0054045 | A1 | | 3/2004 | Nodera et al. | |

FOREIGN PATENT DOCUMENTS

| CN | 1347435 | | 5/2002 |
| EP | 0 213 466 | * | 3/1987 |
| EP | 0213466 | | 3/1987 |
| EP | 0 305 764 | * | 8/1989 |
| EP | 1142956 | | 10/2001 |
| EP | 1728823 | | 6/2006 |
| GB | 1268264 | | 3/1972 |

(Continued)

OTHER PUBLICATIONS

Machine translation of JP 2002-212409 (2002).*
EP communication dated Jun. 12, 2012 for EP application No. EP 05721017.1-1214.
Database WPI, Week 198107, Thomas Scientific, London, GB: AN 1981-10577D.
Extended European Search Report for EP Application No. 12000759. 6-1214 dated Apr. 11, 2012.
Database WPI, Week 200261, Thomson Scientific, London, GB.
Supplementary European Search Report dated Jun. 25, 2010 for EP Application No. 05721017.1.
Taiwanese Office Action issued in patent Application No. 09820351930 dated Jun. 11, 2009.

(Continued)

*Primary Examiner* — Doris L Lee

(74) *Attorney, Agent, or Firm* — Dentons US LLP

(57) ABSTRACT

A flame retardant resin composition in which an acrylonitrile-styrene based polymer, into which sulfonic acid groups and/or sulfonate groups have been introduced by sulfonating processing with a sulfonating agent containing less than 3 wt % of moisture, is contained in a resin to be made flame retardant, so that flame retardant properties will be conferred on the resin flame resistant.

11 Claims, No Drawings

(56) References Cited

FOREIGN PATENT DOCUMENTS

| | | | |
|---|---|---|---|
| JP | 55-157641 A | | 8/1980 |
| JP | 56-110722 | | 9/1981 |
| JP | 62-70420 | | 3/1987 |
| JP | 04-077550 | | 3/1992 |
| JP | 11-172063 | | 6/1999 |
| JP | 2001-002941 | | 1/2001 |
| JP | 2001-181342 | | 7/2001 |
| JP | 2001-181444 | | 7/2001 |
| JP | 2002-212409 | * | 7/2002 |
| JP | 2002-226697 | | 8/2002 |
| JP | 2003-064229 | | 3/2003 |
| WO | 0110956 | | 2/2001 |
| WO | 200127201 | | 4/2001 |
| WO | WO 01/27201 | * | 4/2001 |
| WO | 02059206 | | 8/2002 |
| WO | WO/03/078525 | | 9/2003 |
| WO | WO 2004/018561 | * | 3/2004 |
| WO | 2005-090468 | | 9/2005 |

OTHER PUBLICATIONS

Japanese Office Action dated Feb. 2, 2008 for Japanese Application No. JP 2004-085477.
Japanese Office Action dated Feb. 2, 2008 for Japanese Application No. JP 2004-085479.
Japanese Office Action dated Feb. 2, 2008 for Japanese Application No. JP 2004-085480.
European Communication dated Aug. 16, 2011 for European Application No. 05 721017.1-1214.
International Search Report dated Jun. 14, 2005.
Extended European Search Report issued in connection with related EP application No. EP 13 003603 dated Nov. 11, 2013.
Chinese Office Examination Report issued in connection with related Chinese Patent Application No. CN 201310656423.4 dated Feb. 22, 2016.
European Patent Office Communication Pursuant to Article 94(3) EPC corresponding to European Serial No. 13003603.1 dated May 19, 2016.

* cited by examiner

FLAME RETARDER, FLAME RETARDANT RESIN COMPOSITION AND METHOD OF PRODUCING THE FLAME RETARDER

RELATED APPLICATION DATA

This application is a continuation of U.S. patent application Ser. No. 10/598,899 filed on Sep. 14, 2006, which is a 371 of International Application No. PCT/JP05/04830 filed on Mar. 17, 2005 in the Japan Patent Office, the entireties of both of which are incorporated by reference herein to the extent permitted by law. The present application also claims the benefit of priority to Japanese Patent Applications Nos. JP 2004-085477, JP 2004-085479 and JP 2004-085480, all filed on Mar. 23, 2004, the entireties of both of which are incorporated herein by reference to the extent permitted by law.

TECHNICAL FIELD

This invention relates to a flame retarder for imparting flame retardant properties to a resin composition, a flame retardant resin composition containing this flame retarder, and to a method of producing the flame retarder.

BACKGROUND ART

The flame retarders for resin, used in these years for conferring flame retardant properties on a resin composition, may be exemplified by metal hydroxide based (e.g. magnesium hydroxide or aluminum hydroxide) flame retarders, silicon based (e.g. silicone or silica) flame retarders, halogen-based (bromine) flame retarders and phosphorus-based (e.g. phosphate or red phosphorus) flame retarders.

The metal hydroxide based flame retarders suffer from the defect that they are added in larger quantities in the resin and hence the mechanical properties of the resin are impaired. The silicon-based flame retarders suffer from the defect that the sorts of the resin compositions, the silicon-based flame retarders may be applied to, are limited. On the other hand, the consumption of halogen-based flame retarders tends to be decreased because they are detected in animals or in woman's milk, or there is fear of generation of bromine-based dioxin on combustion.

Thus, the phosphorus-based flame retarders are currently attracting attention as a substitute material for the above flame retarders. However, the phosphorus-based flame retarders suffer from a problem that gases may be evolved on injection molding a resin composition, or the resin composition may be lowered in thermal resistance.

In connection with use of the polycarbonate resin, as a resin composition, a flame retarder for resin of a polystyrene sulfonate resin type, which is a metal salt flame retarder, has been proposed in JP Laid-Open Patent Publications 2001-181342, 2001-181444 and 2001-2941.

The flame retarders for resins, proposed in these Patent publications, suffer from the problem that the resin compositions, the flame retarders may be applied to, are limited to polycarbonate resins, that the flame retardant effect is insufficient, and that the flame retarders are not dispersed substantially uniformly, that is, that the flame retarders are poor in compatibility. For this reason, there is raised a demand for a flame retarder for resin exhibiting higher flame retardant properties.

In particular, a flame retarder for resin, proposed in JP Laid-Open Patent Publication 2002-2941, contains an amide group or a carboxyl group, liable to take up the moisture, such that, when the resin composition, containing the flame retarder, is stored for prolonged time, there is raised such a problem that the resin composition is discolored and impaired in appearance, or the resin itself becomes embrittled, that is, the resin is lowered in mechanical strength.

DISCLOSURE OF THE INVENTION

Problem to be solved by the Invention

It is an object of the present invention to provide a flame retarder having high compatibility with respect to a resin composition and which is capable of suppressing deterioration in appearance or in mechanical strength on prolonged storage of the resin composition. It is also an object of the present invention to provide a flame retardant resin composition and a method for producing the flame retarder.

For solving the above problem, the present inventors have conducted perseverant researches, and have found that a styrene-based polymer, containing a preset amount of acrylonitrile as a monomer unit, and into which have been introduced preset amounts of sulfonic acid groups and/or sulfonate groups, is superior as a flame retarder for resin. This finding has led to fulfillment of the present invention.

A flame retarder according to the present invention is to be contained in a resin composition to confer flame retardant properties on the resin composition. The flame retarder comprises an acrylonitrile-styrene based polymer containing at least acrylonitrile and styrene. The acrylonitrile-styrene based polymer has been sulfonated with a sulfonating agent containing less than 3 wt % of moisture, so that sulfonic acid groups and/or sulfonate groups have been introduced into the acrylonitrile-styrene based polymer.

A flame retardant resin composition according to the present invention contains a flame retarder to confer flame retardant properties on the resin composition. The flame retarder includes an acrylonitrile-styrene based polymer containing at least acrylonitrile and styrene. The acrylonitrile-styrene based polymer has been sulfonated with a sulfonating agent containing less than 3 wt % of moisture, so that sulfonic acid groups and/or sulfonate groups have been introduced into the acrylonitrile-styrene based polymer.

A method for producing a flame retarder according to the present invention produces a flame retarder to be contained in a resin composition to confer flame retardant properties on said resin composition. The method comprises sulfonating the acrylonitrile-styrene based polymer, containing at least acrylonitrile and styrene, with a sulfonating agent containing less than 3 wt % of moisture, for introducing sulfonic acid groups and/or sulfonate groups into the acrylonitrile-styrene based polymer, to produce a flame retarder.

A method for producing a flame retarder according to the present invention produces a flame retarder to be contained in a resin composition to confer flame retardant properties on said resin composition. The method comprises reacting a powdered acrylonitrile-styrene based polymer, containing at least acrylonitrile and styrene, with an $SO_3$ gas for performing sulfonating processing for introducing sulfonic acid groups and/or sulfonate groups into the acrylonitrile-styrene based polymer.

According to the present invention, since the acrylonitrile-styrene based polymer, into which sulfonic acid groups and/or sulfonate groups have been introduced by sulfonating processing with a sulfonating agent containing less than 3 wt % of the moisture, is used as a flame retarder, the sorts of the resin composition, that can properly be made flame retardant, can be proliferated, while the flame retarder may be dispersed substantially evenly in the resin composition.

Moreover, according to the present invention, since an acrylonitrile-styrene based polymer, containing sulfonic acid groups and/or sulfonate groups introduced therein, is contained as a flame retarder in a resin composition, a frame retardant resin composition of superior quality may be obtained in which defects in appearance or poor mechanical strength are not produced on prolonged storage.

A flame retarder according to the present invention is to be contained in a resin composition to confer flame retardant properties on the resin composition. With the flame retarder, sulfonic acid groups and/or sulfonate groups have been introduced into an aromatic polymer containing monomer units having aromatic skeletons in an amount ranging between 1 mol % and 100 mol %, with the polymer having a weight average molecular weight ranging between 25000 and 10000000. The sulfur content in the sulfonic acid groups and/or sulfonate groups ranges between 0.001 wt % and 20 wt %.

A flame retardant resin composition according to the present invention contains a flame retarder which confers flame retardant properties on the resin composition. With the flame retarder, sulfonic acid groups and/or sulfonate groups have been introduced into an aromatic polymer containing monomer units having aromatic skeletons in an amount ranging between 1 mol % and 100 mol %, with the polymer having a weight average molecular weight ranging between 25000 and 10000000. The sulfur content of the sulfonic acid groups and/or sulfonate groups ranges between 0.001 wt % and 20 wt %.

According to the present invention, since an aromatic polymer of a preset molecular weight, into which have been introduced preset amounts of sulfonic acid groups and/or sulfonate groups, is used as a flame retarder, the sorts of the resin composition, that can properly be made flame retardant, can be proliferated, while the flame retarder may be dispersed substantially evenly in the resin composition.

Moreover, according to the present invention, since an acrylonitrile-styrene based polymer, containing sulfonic acid groups and/or sulfonate groups introduced therein, is contained as a flame retarder in the resin composition, a frame retardant resin composition of superior quality may be obtained in which defects in appearance or poor mechanical strength are not produced on prolonged storage.

A flame retarder according to the present invention is to be contained in a resin composition to confer flame retardant properties on the resin composition. The flame retarder includes an aromatic polymer containing monomer units having aromatic skeletons ranging between 1 mol % and 100 mol %. Into the aromatic polymer, sulfonic acid groups and/or sulfonate groups have been introduced in an amount ranging between 0.01 mol % and 14.9 mol %.

A flame retardant resin composition according to the present invention contains a flame retarder to confer flame retardant properties on the resin composition. The flame retarder includes an aromatic polymer containing monomer units having aromatic skeletons ranging between 1 mol % and 100 mol %. Into the aromatic polymer, sulfonic acid groups and/or sulfonate groups have been introduced in an amount ranging between 0.01 mol % and 14.9 mol %.

According to the present invention, since the aromatic polymer, into which have been introduced preset amounts of sulfonic acid groups and/or sulfonate groups, is used as a flame retarder, the sorts of the resin composition, that can properly be made flame retardant, can be proliferated, while the flame retarder may be dispersed substantially evenly in the resin composition.

Moreover, according to the present invention, since an aromatic polymer, into which sulfonic acid groups and/or sulfonate groups have been introduced by sulfonating processing with a sulfonating agent containing less than 3 wt % of moisture, is contained in the resin composition, as a flame retarder, a flame retardant resin composition of superior quality may be obtained in which defects in appearance or poor mechanical strength are not produced on prolonged storage.

Other objects and advantages of the present invention will become more apparent from the embodiments and examples which will now be explained.

BEST MODE FOR CARRYING OUT THE INVENTION

A flame retarder, a flame retardant resin composition and a method for producing the flame retarder, according to the present invention, will now be described in detail.

The flame retardant resin composition, embodying the present invention, is a resin material used for household electrical products or fibers. It is a resin material, which is to be made flame retardant, and which has been made flame retardant by the flame retarder contained therein.

The flame retarder, contained in the flame retardant resin composition, is a polymer containing at least acrylonitrile and styrene, and into which a preset amount(s) of sulfonic acid group and/or a sulfonate group have been introduced.

Specifically, the polymer containing acrylonirile and styrene, referred to below as an acrylonitrile-styrene based polymer, may be enumerated by, for example, an acrylonitrile-styrene copolymer (AS), an acrylonitrile-butadiene-styrene copolymer (ABS), an acrylonitrile-chlorinated polyethylene-styrene resin (ACS), an acrylonitrile-styrene-acrylate copolymer (ASA), an acrylonitrile-ethylene propylene rubber-styrene copolymer (AES), and an acrylonitrile-ethylene-propylene-diene-styrene resin (AEPDMS). These may be used either alone or in combination.

In the acrylonitrile-styrene based polymer, the acrylonitrile units contained therein are preferably in the range from 1 mol % to 90 mol %, more preferably in the range from 10 mol % to 80 mol % and most preferably in the range from 20 mol % to 70 mol %.

If the amount of the acrylonitrile units, contained in the acrylonitrile-styrene based polymer, is less than 1 mol %, the flame retarder becomes difficult to disperse substantially evenly in the flame retardant resin composition. That is, the flame retarder becomes poor in compatibility with respect to the resin composition, such that it becomes difficult to achieve high flame retardant properties. If, on the other hand, the amount of the acrylonitrile units, contained in the acrylonitrile-styrene based polymer, is more than 90 mol %, the introducing rate of sulfonic acid groups or sulfonate groups into the acrylonitrile-styrene based polymer becomes lower with the consequence that only limited effects of donating flame retardant properties to the flame retardant resin composition may be achieved.

On the other hand, the amount of styrene units, contained in the acrylonitrile-styrene based polymer, is preferably in the range from 1 to 99 mol %, more preferably in the range from 10 to 90 mol % and most preferably in the range from 20 to 80 mol %.

If the amount of styrene units, contained in the acrylonitrile-styrene based polymer, is less than 1 mol %, the introducing rate of the sulfonic acid groups or sulfonate groups becomes lower, such that optimum flame retardant properties cannot be achieved. If, on the other hand, the amount of styrene units, contained in the acrylonitrile-styrene based polymer, is more than 99 mol %, the flame retarder becomes poor in compatibility with respect to the resin composition, such that it becomes difficult to achieve superior flame retardant properties.

Meanwhile, the acrylonitrile units and the styrene units may be alternately copolymerized, or may be block polymerized. Preferably, the acrylonitrile units and the styrene units are alternately copolymerized for conferring adequate flame retardant properties on the flame retardant resin composition.

It is noted that the weight average molecular weight of the acrylonitrile-styrene based polymer is preferably 1000 to 10000000, more preferably 5000 to 1000000 and most preferably 20000 to 500000.

If the weight average molecular weight of the acrylonitrile-styrene based polymer deviates from the range from 5000 to 10000000, the flame retarder becomes difficult to disperse substantially evenly in the resin which is to be flame retardant, that is, the flame retarder becomes poor in compatibility with respect to the resin, with the result that it becomes difficult to confer suitable flame retardant properties to the flame retardant resin composition.

In the acrylonitrile-styrene based polymer, the styrene unit holds a benzene ring, and hence is useful in introducing sulfonic acid groups and/or sulfonate groups as later explained. On the other hand, the acrylonitrile unit contributes to improving the compatibility of the polymer with respect to the resin composition.

As the acrylonitrile-styrene based polymer, used-up redeemed materials or scraps from the plant may be used. That is, the acrylonitrile-styrene based polymer, which serve as a feedstock material, is superior in recycling performance and contributes to cost reduction.

The method for introducing the sulfonic acid groups and/or sulfonate groups into the acrylonitrile-styrene based polymer may be exemplified by a method of sulfonating the acrylonitrile-styrene based polymer with a preset sulfonating agent.

The sulfonating agent, used for sulfonating an acrylonitrile-styrene based polymer, preferably contains less than 3 wt % of the moisture. Specifically, the sulfonating agent is one or more selected from the group consisting of sulfuric anhydride, fuming sulfuric acid, chlorosulfonic acid and polyalkylbenzene sulfonic acid. A complex of, for example, alkyl phosphates or dioxane with Lewis bases may also be used as the sulfonating agent.

If, with the use of, for example, concentrated sulfuric acid, with the water content of 96 wt %, as a sulfonating agent, the acrylonitrile-styrene based polymer is sulfonated to produce a flame retarder, the cyano groups in the polymer are hydrolyzed and thereby converted into amide groups or carboxyl groups, exhibiting high hygroscopicity, such that a flame retarder containing these amide or carboxyl groups is generated. If the flame retarder, containing larger quantities of the amide groups or carboxyl groups, is used, excellent flame retardant properties can be conferred on the flame retardant resin composition. However, there is fear that water is taken up from outside with lapse of time so that inconveniences such as change in color of the flame retardant resin composition and consequent impairment in appearance or deterioration in the mechanical strength of the resin may arise. Specified examples of this type of the flame retarder are polystyrene sulfonate flame retarder as proposed in, for example, the JP Laid-Open Patent Publication 2001-2941.

In light of the above, the method of sulfonating the acrylonitrile-styrene based polymer may be exemplified by a method consisting in adding a preset amount of the sulfonating agent to a solution, obtained on dissolving the acrylonitrile-styrene based polymer in an organic solvent (chlorine-based solvent), to carry out the reaction. There is also such a method consisting in adding a preset amount of a preset sulfonating agent to a liquid obtained on dispersing a pulverulent acrylonitrile-styrene based polymer in an organic solvent (the liquid which is not a solution) to carry out the reaction. There are also such a method consisting in directly injecting an acrylonitrile-styrene based polymer into a sulfonating agent, and such a method consisting in directly spraying a sulfonating gas, specifically a gas of a sulfuric anhydride ($SO_3$), to a pulverulent acrylonitrile-styrene based polymer, to carry out the reaction.

To the acrylonitrile-styrene based polymer are introduced the sulfonic acid groups (—$SO_3H$) or the sulfonate groups either directly or as these groups have been neutralized with ammonia or amine compounds. Specifically, the sulfonates may be enumerated by, for example, Na salts, K salts, Li salts, Ca salts, Mg salts, Al salts, Zn salts, Sb salts and Sn salts of sulfonic acid.

It is noted that higher flame retardant properties may be conferred on the resin composition when sulfonate groups, rather than the sulfonic acid groups, have been introduced into the acrylonitrile-styrene based polymer of the flame retarder.

Also, in the flamer retarder, the amount of the sulfonic acid groups and/or sulfonate groups, introduced into the acrylonitrile-styrene based polymer of the flame retarder, is based on the content of sulfur (S) in the flame retarder. Specifically, the sulfur content in the flame retarder is preferably 0.001 to 16 wt %, more preferably 0.01 to 10 wt % and most preferably 0.1 to 5 wt %.

If the sulfur content in the flame retarder is less than 0.001 wt %, the amount of the sulfonic acid groups and/or the sulfonate groups, introduced into the acrylonitrile-styrene based polymer, is so small that it becomes difficult to confer flame retardant properties on the flame retardant resin composition. If conversely the sulfur content in the flame retarder is more than 16 wt %, the amount of sulfonic acid groups and/or the sulfonate groups introduced into the acrylonitrile-styrene based polymer becomes excessive, so that there is fear that the flame retarder is lowered in compatibility with respect to the resin composition. There is also fear that the flame retardant resin composition is deteriorated in mechanical strength with lapse of time, or the blooming time becomes longer at the time of combustion.

The resin composition, in which the aforementioned flame retarder is to be contained and which is to be thereby made flame retardant, may be enumerated by, for example, polycarbonate (PC), an acrylonitrile-butadiene-styrene copolymer (ABS), polystyrene (PS), an acrylonitrile-styrene copolymer (AS), polyvinyl chloride (PVC), polyphenylene oxide (PPO), polyethylene terephthalate (PET), polybutylene terephthalate (PBT), polysulfone (PSF), thermoplastic elastomer (TPE), polybutadiene (PB), polyisoprene (PI), nitrile rubber (acrylonitrile-butadiene rubber, nylon, and polylactic acid (PLA). Such resin composition containing one or more of the above resins in an amount of 5 wt % or more is used. That is, one of the above resins or a mixture containing two or more of the above resins (alloy) may be used as the resin to be made flame retardant.

The resin composition, in which the aforementioned flame retarder is to be contained and which is to be thereby made flame retardant particularly effectively, may be enumerated by, for example, ABS, (HI)PS, AS, PPO, PBT, PET, PVC, PLA, an ABS/PC alloy, a PS/PC alloy, an AS/PC alloy, an HIPS/PC alloy, a PET/PC alloy, a PBT/PC alloy, a PVC/PC alloy, a PLA (polylactic acid)/PC alloy, a PPO/PC alloy, a PS/PPO alloy, a HIPS/PPO alloy, an ABS/PET alloy and a PET/PBT alloy. These resin compositions may be used either alone or in combination.

Similarly to the aforementioned flame retarder, the resin to be made flame retardant may be used-up redeemed materials or scraps from the plant. That is, in the flame retardant resin composition, the resin to be made flame retardant, which serves as a feedstock material, is superior in recycling performance, and contributes to cost reduction.

In the above-described flame retardant resin composition, the acrylonitrile-styrene based polymer, which has been sulfonated with a sulfonating agent containing less than 3 wt % of moisture, and into which the sulfonic acid groups and/or the sulfonate groups have thereby been introduced, is used as a flame retarder. This may increase the number of sorts of the resins which are to be optimally made flame retardant.

Moreover, in this flame retardant resin composition, superior flame retardant properties may be developed because the acrylonitrile units of the acrylonitrile-styrene based polymer, acting as a flame retarder, operate for substantially evenly dispersing the flame retarder in the resin which is to be rendered flame retardant.

In addition, in this flame retardant resin composition, the flame retarder contained therein has been produced by sulfonating processing with a sulfonating agent, containing less than 3 wt % of water, such that none of the amide groups or carboxylic groups, exhibiting high hygroscopicity, is introduced into the flame retarder. Hence, it becomes possible to prohibit such inconvenience that water is taken up on prolonged storage so that the resin composition is changed in color, deteriorated in appearance or lowered in mechanical strength.

Furthermore, in the flame retardant resin composition, the content of the flame retarder is preferably 0.0001 to 30 wt %, more preferably 0.001 to 10 wt % and most preferably 0.01 to 3 wt %.

If the content of the flame retarder is less than 0.0001 wt %, it becomes difficult to effectively confer flame retardant properties to the resin composition. If, on the other hand, the content of the flame retarder is more than 30 wt %, the effect becomes negative, that is, the resin composition to be rendered flame retardant tends to be combustible.

That is, the present flame retarder may be added in a minor quantity to the resin to be rendered flame retardant, in which case the flame retardant properties may be efficaciously conferred on the flame retardant resin composition as an ultimate product.

The above-described flame retardant resin composition may also be added by known routine flame retarders, in addition to the above-described flame retarders, for further improving the flame retardant properties.

These known routine flame retarders may be enumerated by, for example, organic phosphate based flame retarders, halogenated phosphate based flame retarders, inorganic phosphorus based flame retarders, halogenated bisphenol based flame retarders, halogenated compound based flame retarders, antimony based flame retarders, nitrogen based flame retarders, boron based flame retarders, metal salt based flame retarders, inorganic flame retarders and silicon based flame retarders. These flame retarders may be used either singly or in combination.

Specifically, the organic phosphate or phosphite based flame retarders may be enumerated by, for example, triphenyl phosphate, methyl neobenzyl phosphate, pentaerythrytol diethyl diphosphate, methyl neopentyl phosphate, phenyl neopentyl phosphate, pentaerythrytol diphenyl diphosphate, dicyclopentyl hypodiphosphate, dineopentyl hypodiphosphite, phenyl pyrocatechol phosphite, ethyl pyrocatechol phosphate and dipyrocatechol hypodiphosphate. These may be used either alone or in combination.

The halogenated phosphate based flame retarders may be enumerated by, for example, tris(β-chloroethyl) phosphate, tris(dicyclopropyl) phosphate, tris(β-bromoethyl) phosphate, tris(dibromopropyl) phosphate, tris(chloropropyl) phosphate, tris(dibromophenyl) phosphate, tris(tribromophenyl) phosphate, tris(tribromoneopentyl) phosphate, condensed polyphosphate and condensed polyphosphonate. These may be used either alone or in combination.

The inorganic phosphorus based flame retarder may be exemplified by, for example, red phosphorus and inorganic phosphates. These may be used either alone or in combination.

The halogenated bisphenol based flame retarder may be enumerated by, for example, tetrabromobisphenol A, oligomers thereof and bis(bromoethylether)tetrabromobisphenol A. These may be used either alone or in combination.

The halogen compound based flame retarder may be enumerated by decabromodiphenyl ether, hexabromobenzene, hexabromocyclododecane, tetrabromo phthalic anhydride, (tetrabromobiphenol) epoxy oligomer, hexabromobiphenyl ether, tribromophenol, dibromocresyl glycidyl ether, decabromodiphenyl oxide, halogenated polycarbonate, halogenated polycarbonate copolymers, halogenated polystyrene, halogenated polyolefin, chlorinated paraffin and perchlorocyclodecane. These may be used either alone or in combination.

The antimony based flame retarder may be enumerated by, for example, antimony trioxide, antimony tetroxide, antimony pentoxide and sodium antimonite. These may be used either alone or in combination.

The nitrogen-based flame retarders may be enumerated by, for example, melamine, alkyl group substituted or aromatic group substituted melamine, melamine cyanurate, melamine isocyanurate, melamine phosphate, triazine, guanidine compounds, urea, a variety of cyanuric acid derivatives and phosphasene compounds. These may be used either alone or in combination.

Examples of boric acid based flame retarder may include zinc borate, zinc metaborate and barium metaborate. These may be used either alone or in combination.

Examples of metal salt based flame retarder include alkali metal salts and alkali earth metal salts of perfluoroalkane sulfonic acid, alkylbenzene sulfonic acid, halogenated alkylbenzene sulfonic acid, alkylsulfonic acid and naphthalene sulfonic acid. These may be used either alone or in combination.

The inorganic flame retarder may be enumerated by, for example, magnesium hydroxide, aluminum hydroxide, barium hydroxide, calcium hydroxide, dolomite, hydrotalcite, basic magnesium carbonate, hydrogenated zirconium, hydrates of inorganic metal compounds, such as hydrates of tin oxide, metal oxides, such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide and tungsten oxide, powders of metals, such as aluminum, iron, copper, nickel, titanium, manganese, tin, zinc, molybdenum, cobalt, bismuth, chromium, tungsten and antimony, and carbonates, such as zinc carbonate, magnesium carbonate, calcium carbonate and barium carbonate. These may be used either alone or in combination.

Out of the inorganic flame retarders, magnesium hydroxide, aluminum hydroxide, talc, which is a hydrated silicate of magnesium, basic magnesium carbonate, mica, hydrotalcite and aluminum are desirable from the perspective of flame retardant properties and from economic considerations. Meanwhile, used-up redeemed materials or scraps from the plant may be used as inorganic flame retarders.

Examples of silicon-based flame retarders include polyorganosiloxane resins (silicone or organic silicates) and silica. These may be used either alone or as a mixture. The polyorganosiloxane resins may be exemplified by polymethylethyl silixane resins, polydimethyl silixane resins, polymethyl phenyl siloxane resins, polydiphenyl siloxane resins, polydiethyl siloxane resins, polyethylphenyl siloxane resins, and mixtures thereof.

In the alkyl moiety portions of each of these polyorganosiloxane resins, there may be contained functional groups, such as alkyl groups, alkoxy groups, hydroxyl groups, amino groups, carboxyl groups, silanol groups, mercapto groups, epoxy groups, vinyl groups, aryloxy groups, polyoxy alkylene groups, hydrogen groups or halogens. In particular, there may preferably be contained alkyl groups, alkoxy groups, hydroxyl groups and vinyl groups.

The polyorganosiloxane resins are of the average molecular weight not less than 100 and preferably in a range from 500 to 5000000, and may be in the form of oil, varnish, gum, powders or pellets. As for silica, it is preferably surface-processed with a silane coupling agent of hydrocarbon based compounds.

The above-described known flame retarders are usually contained in an amount of 0.001 to 50 wt %, preferably in an amount of 0.01 to 30 wt % and more preferably in an amount of 0.1 to 10 wt %, based on the weight of the resin to be rendered flame retardant, depending on the sort of the flame retarder, the level of flame retardant performance needed, and on the sort of the resin to be rendered flame retardant.

The flame retardant resin composition, containing the aforementioned flame retarder, may also be added by, for example, known routine inorganic fillers, for improving mechanical strength or for further improving flame retardant properties.

These known routine inorganic fillers may be enumerated by, for example, crystalline silica, fused silica, alumina, magnesia, talc, mica, kaolin, clay, diatomaceous earth, calcium silicate, titanium oxide, glass fibers, calcium fluoride, calcium phosphate, barium phosphate, calcium phosphate, carbon fibers, carbon nano-tubes and potassium titanate fibers. Of these, one or more in the form of a mixture may be used. From among these inorganic fillers, talc, mica, carbon, glass or carbon nano-tubes may preferably be employed.

The inorganic fillers are contained in an amount ranging from 0.1 to 90 wt %, preferably in an amount ranging from 0.5 to 50 wt % and more preferably in an amount ranging from 1 to 30 wt %, based on the weight of the flame retardant resin composition.

If the content of the inorganic filler is less than 0.1 wt %, the flame retardant resin composition is lower in rigidity or deteriorated in its effect of improving the flame retardant properties. If, on the other hand, the content of the inorganic filler is higher than 90 wt %, there may be presented such deficiencies that the fused flame retardant resin composition becomes lower in fluidity or is deteriorated in mechanical strength at the time of injection molding of the flame retardant resin composition.

Moreover, the flame retardant resin composition may be added by, for example, fluoro olefin resins, besides the aforementioned flame retardant, for the purpose of suppressing the dripping phenomenon at the time of combustion.

The fluoro olefin resins, capable of suppressing the dripping phenomenon, may be exemplified by difluoroethylene polymers, tetrafluoroethylen polymers, tetrafluoroethylen-hexafluoropropylene copolymers and copolymers of tetrafluoroethylen and ethylenic monomers. These may be used either alone or in combination.

Of these fluoro olefin resins, tetrafluoroethylene polymers are most preferred. The average molecular weight of the tetrafluoroethylene polymers is 50000 or more and preferably in a range from 100000 to 20000000. Meanwhile, the fluoro olefin resins exhibiting fibril-forming properties are most preferred.

The content of the fluoro olefin resins is in a range from 0.001 to 5 wt %, preferably 0.005 to 2 wt % and more preferably 0.01 to 0.5 wt %, based on the weight of the flame retardant resin composition.

If the content of the fluoro olefin resins becomes less than 0.001 wt %, it becomes difficult to suppress the dripping phenomenon. If conversely the content of the fluoro olefin resins becomes larger than 5 wt %, the effect in suppressing the dripping phenomenon is saturated, thus presenting inconveniences such as high cost or poor mechanical strength.

Moreover, the flame retardant resin composition may be added by, for example, an anti-oxidant (phenol-based, phosphorus-based or sulfur-based anti-oxidant), an anti-static agent, a UV absorber, a light stabilizer, a plasticizer, a compatibility promoting agent, a coloring agent (pigments or dyestuffs), a bactericidal agent, an anti-hydrolysis agent or a surface processing agent, in addition to the aforementioned flame retarder, for the purpose of improving injection moldability, shock-proofness, appearance, thermal resistance, weatherability and rigidity.

In producing the above-described flame retardant resin composition, the flame retarder, resin to be made flame retardant, and the other additives, are dispersed substantially evenly in a kneading unit, such as a tumbler, a reblender, a mixer, an extruder or a co-kneader, and the resulting mass is molded to a preset shape by any suitable molding method, such as injection molding, injection compression molding, extrusion molding, blow molding, vacuum molding, press molding, foam molding or supercritical molding.

The molded product, formed of the flame retardant resin composition, is used in many fields, as an enclosure or a component part for e.g. domestic electrical utensil, cars, information equipment, business equipment, telephone sets, stationeries, furniture or fiber, which has been made flame retardant.

Several preferred Examples for testifying to the merit of the present invention and several Comparative Examples for comparison to the preferred Examples will now be described.

First, several inventive samples and control samples of a flame retarder, to be contained in the preferred Examples and the Comparative Examples, were prepared.

(Inventive Sample 1)

In preparing the inventive sample 1, 3 g of an acrylonitrile-butadiene-styrene copolymer resin, as an acrylonitrile-styrene based polymer, made up by 39 mol % of acrylonitrile units, 50 mol % of styrene units and 11 mol % of butadiene units, and which was pulverized to a particle size not larger than 32 mesh, were introduced into a round-bottom flask, which was previously charged with 24 g of cyclohexane. The pulverulent resin, thus charged, was dispersed therein, to prepare a slurried polymer solution. Then, 7 g of sulfuric anhydride were added to the polymer solution and agitated for one hour at ambient temperature by way of sulfonating the acrylonitrile-styrene based polymer. Then, residual gases in the flask were removed by air bubbling, and solid contents were taken out by a glass filter. The solid contents, thus obtained, were injected into water. After adjusting the pH to 7 with potassium hydroxide, the resulting sold contents were again filtered, using a glass filter, and dried in a vacuum drier (50° C.×10 hours) to yield a brown flame retarder. In this manner, an acrylonitrile-styrene based polymer, having sulfonic acid groups introduced therein, could be prepared as a flame retarder.

The flame retarder, thus prepared, was subjected to elementary analysis, using a combustion flask method. The sulfur content in the flame retarder prepared was 14 wt %. The flame retarder was also analyzed as to its ingredients, using a Fourier transform-infrared spectrophotometer (FT-IR). The result of the analysis indicated no characteristic absorption proper to amide or carboxyl groups.

(Inventive Sample 2)

In preparing an inventive sample 2, a transparent reel material of a used-up cassette for business use, as an acrylonitrile-styrene based polymer, was crushed and pulverized into powders of the acrylonitrile-styrene based copolymer resin (acrylonitrile units: 44 mol %; styrene units: 56 mol %) capable of passing through a 83 mesh screen. 2 g of the powdered material were charged into a round-bottom flask and stirred. As the powdered material was kept in an agitated state, an $SO_3$ gas, emanated from 3 g of fuming sulfuric acid, was blown at ambient temperature into the flask over four hours, by way of sulfonating the acrylonitrile-styrene based polymer. Air was then blown into the round-bottom flask to remove the residual $SO_3$ gas from the inside thereof. Water was then added into the flask and the pH value of the water was adjusted to 7 with sodium hydroxide. The solid content (reformed resin) was taken out by filtering through a glass filter and dried (vacuum driver: 50° C.×10 hours) to yield a flame retarder in the form of white powders). That is, the inventive sample 2 is again an acrylonitrile-styrene based polymer into which were introduced sulfonic acid groups.

The sulfur content in the flame retarder, thus obtained, was measured in the same way as in the aforementioned inventive sample 1. The sulfur content was found to be 2.1 wt %. The elementary analysis of the flame retarder was carried out in the same way as in the inventive sample 1. No characteristic absorption proper to the amide or carboxyl groups was noticed.

(Inventive Sample 3)

In the inventive sample 2, flame retarder in the form of white powders could be prepared in the same way as in the above-described inventive sample 2, except setting the sulfonating time duration to ten minutes. The sulfur content in the flame retarder, thus obtained, was measured in the same way as in the aforementioned inventive sample 1. The sulfur content was found to be 0.05 wt %. The elementary analysis of the flame retarder was carried out in the same way as in the inventive sample 1. No characteristic absorption proper to the amide or carboxyl groups was noticed. Hence, the inventive sample 3 is again an acrylonitrile-styrene based polymer into which were introduced sulfonic acid groups.

(Control Sample 1)

In the control sample 1, a flame retarder was prepared in the same way as in the aforementioned inventive sample 2, except using a polystyrene resin (molecular weight: 20000) in place of the acrylonitrile-styrene based polymer. That is, the control sample 1 differs from the inventive samples in that a sulfonic acid group has been introduced into the polystyrene resin.

The sulfur content in the flame retarder, thus obtained, was measured in the same way as in the aforementioned inventive sample 1. The sulfur content was found to be 2.2 wt %. The elementary analysis of the flame retarder was carried out in the same way as in the inventive sample 1. No characteristic absorption proper to the amide or carboxyl groups was noticed.

(Control Sample 2)

In the control sample 2, sodium polystyrene sulfonate (weight average molecular weight: 18000) was used as a flame retarder. The sulfur content in the flame retarder, thus obtained, was measured in the same way as in the aforementioned inventive sample 1. The sulfur content was found to be 14 wt %. The elementary analysis of the flame retarder was then carried out in the same way as in the inventive sample 1. No characteristic absorption proper to the amide or carboxyl groups was noticed.

(Control Sample 3)

In preparing the control sample 3, 96 wt % of concentrated sulfuric acid, as a sulfonating agent used for sulfonation processing, was heated to 80° C. In this sulfonating agent, the same resin powders as those used in the inventive sample 2 were charged and reacted for one hour. After the end of the reaction, the solid content was recovered on filtering. In the second washing with water, the pH value was adjusted to 7 with sodium hydroxide. The solid content, obtained on filtering, was dried to give a flame retarder. The sulfur content in the flame retarder, thus obtained, was measured in the same way as in the aforementioned inventive sample 1. The sulfur content was found to be 8 wt %. The elementary analysis of the flame retarder was carried out in the same way as in the inventive sample 2. The analysis indicated absorption characteristic of the amide groups or carboxyl groups. That is, the control sample 3 is an acrylonitrile-styrene polymer containing amide groups and carboxylic groups introduced in addition to the sulfonic acid groups.

The flame retarders of the inventive samples and the control samples, obtained as described above, were introduced into a preset resin, which is to be made flame retardant, by way of preparing Examples and Comparative Examples.

EXAMPLE 1

In an Example 1, 99.8 parts by weight of a polycarbonate resin (bisphenol A), referred to below as PC, as a resin which is to be made flame retardant, 0.1 part by weight of the inventive sample 2, as a flame retarder, and 0.1 part by weight of polytetrafluoroethylene exhibiting fibril-forming properties, referred to below as PTFE, as an anti-drip agent, were mixed together to prepare a flame retardant resin precursor. This flame retardant resin precursor was supplied to an injection molding machine, kneaded at a preset temperature and pelletized. The pellets, thus prepared, were charged into an extruder to carry out injection molding at a preset temperature. In this manner, a strip-shaped test piece, 1.5 mm in thickness, formed of a flame retardant resin composition, was prepared.

EXAMPLE 2

In the Example 2, a strip-shaped test piece was prepared in the same way as in the above-described Example 1, except mixing 84.3 parts by weight of PC and 15 parts by weight of an acrylonitrile-butadiene-styrene copolymer resin (acrylonitrile/butadiene/styrene weight ratio=24/20/56), referred to below as ABS resin, as resins to be made flame retardant, 0.1 part by weight of the inventive sample 1, as a flame retarder, 0.5 part by weight of polymethyl phenyl siloxane, referred to below as SI, as a silicon based flame retarder, by way of another flame retarder, and 0.1 part by weight of PTFE, as an anti-drip agent, to prepare a flame retardant resin precursor.

EXAMPLE 3

In the Example 3, a strip-shaped test piece was prepared in the same way as in the above-described Example 1, except mixing 89.2 parts by weight of PC and 10 parts by weight of rubber-modified polystyrene (polybutadiene/polystyrene weight ratio=10/90), referred to below as a HIPS resin, 0.5 part by weight of the inventive sample 3, as a flame retarder, and 0.3 part by weight of PTFE, as an anti-drip agent, to prepare a flame retardant resin precursor.

EXAMPLE 4

In the Example 4, a strip-shaped test piece was prepared in the same way as in the above-described Example 1, except mixing 89.5 parts by weight of PC and 10 parts by weight of an acrylonitrile-styrene copolymer resin (weight ratio acrylonitrile/styrene=25/75), referred to below as AS resin, as resins to be made flame retardant, 0.2 part by weight of the inventive sample 1, as a flame retarder, 0.1 part by weight of SI, as another flame retarder, and 0.2 part by weight of PTFE as an anti-drip agent, to prepare a flame retardant resin precursor.

EXAMPLE 5

In the Example 5, a strip-shaped test piece was prepared in the same way as in the above-described Example 1, except mixing 84 parts by weight of PC and 15 parts by weight of polyethylene terephthalate, referred to below as PET, as resins to be made flame retardant, 0.2 part by weight of the inventive sample 2, as a flame retarder, 0.5 part by weight of SI, as another flame retarder, and 0.3 part by weight of PTFE as an anti-drip agent, to prepare a flame retardant resin precursor.

EXAMPLE 6

In the Example 6, a strip-shaped test piece was prepared in the same way as in the above-described Example 1, except mixing 48.8 parts by weight of PC and 50 parts by weight of polylactic acid, referred to below as PLA, as resins to be made flame retardant, 0.5 part by weight of the inventive sample 2, as a flame retarder, 0.5 part by weight of SI, as another flame retarder, and 0.2 part by weight of PTFE, as an anti-drip agent, to prepare a flame retardant resin precursor.

COMPARATIVE EXAMPLE 1

In the Comparative Example 1, a strip-shaped test piece was prepared in the same way as in the above-described Example 1, except mixing 99.8 parts by weight of PC, as a resin to be made flame retardant, 0.1 part by weight of the control sample 1, as a flame retardant, and 0.1 part by weight of PTFE, as an anti-drip agent, to prepare a flame retardant resin precursor.

COMPARATIVE EXAMPLE 2

In the Comparative Example 2, a strip-shaped test piece was prepared in the same way as in the above-described Example 1, except mixing 99.8 parts by weight of PC, as a resin to be made flame retardant, 0.1 part by weight of the control sample 2, as a flame retarder, and 0.1 part by weight of PTFE, as an anti-drip agent, to prepare a flame retardant resin precursor.

COMPARATIVE EXAMPLE 3

In the Comparative Example 3, a strip-shaped test piece was prepared in the same way as in the above-described Example 1, except mixing 99.8 parts by weight of PC, as a resin to be made flame retardant, 0.1 part by weight of the control sample 3, as a flame retarder, and 0.1 part by weight of PTFE, as an anti-drip agent, to prepare a flame retardant resin precursor.

COMPARATIVE EXAMPLE 4

In the Comparative Example 4, a strip-shaped test piece was prepared in the same way as in the above-described Example 1, except mixing 84.3 parts by weight of PC and 15 parts by weight of an ABS resin, as resins to be made flame retardant, 0.1 part by weight of the control sample 2, as a flame retarder, 0.5 part by weight of SI, as another flame retarder, and 0.1 part by weight of PTFE, as an anti-drip agent, to prepare a flame retardant resin precursor.

COMPARATIVE EXAMPLE 5

In the Comparative Example 5, a strip-shaped test piece was prepared in the same way as in the above-described Example 1, except mixing 89.2 parts by weight of PC and 10 parts by weight of the HIPS resin, as resins to be made flame retardant, 0.5 part by weight of the control sample 1, as a flame retarder, and 0.3 part by weight of PTFE, as an anti-drip agent, to prepare a flame retardant resin precursor.

COMPARATIVE EXAMPLE 6

In the Comparative Example 6, a strip-shaped test piece was prepared in the same way as in the above-described Example 1, except mixing 89.5 parts by weight of PC and 10 parts by weight of an AS resin, as resins to be made flame retardant, 0.2 part by weight of the control sample 3, as a flame retarder, 0.1 part by weight of SI, as another flame retarder, and 0.2 part by weight of PTFE, as an anti-drip agent, to prepare a flame retardant resin precursor.

COMPARATIVE EXAMPLE 7

In the Comparative Example 7, a strip-shaped test piece was prepared in the same way as in the above-described Example 1, except mixing 84 parts by weight of PC and 15 parts by weight of PET, as resins to be made flame retardant, 0.2 part by weight of the control sample 2, as a flame retarder, 0.5 part by weight of SI, as another flame retarder, and 0.3 part by weight of PTFE, as an anti-drip agent, to prepare a flame retardant resin precursor.

COMPARATIVE EXAMPLE 8

In the Comparative Example 8, a strip-shaped test piece was prepared in the same way as in the above-described Example 1, except mixing 48.8 parts by weight of PC and 50 parts by weight of PLA, as resins to be made flame retardant, 0.5 part by weight of the control sample 1, as a flame retarder, 0.5 part by weight of SI, as another flame retarder, and 0.2 part by weight of PTFE, as an anti-drip agent, to prepare a flame retardant resin precursor.

The test on combustibility and the test on appearance were then carried out on the respective Examples and Comparative Examples.

The tests on combustibility were conducted as perpendicular combustibility tests in accordance with V-0, V-1 and V-2 prescriptions of UL 94 (Underwriters' Laboratory Subject 94). Specifically, five test pieces each of the Examples and the Comparative Examples were provided, and a burner flame was applied to each of the strip-shaped test pieces supported substantially upright. This state was maintained for ten seconds and thereafter the burner flame was separated from the test pieces. When the flame was extinguished, the burner flame was applied for further ten seconds, after which the burner flame was separated from the test pieces. Decision was given at this time on the basis of the sum of the time duration of combustion with flame after the end of the first flame contact with the test pieces, the time duration of combustion with flame after the end of the second flame contact with the test pieces, the time duration of combustion with flame after the end of the second flame contact with the test pieces, and the time duration of combustion without flame after the end of the second flame contact with the test pieces, the sum of time durations of combustion with flame of the five test pieces, and the presence/absence of the droppings of combustion. The V-0 prescription provides that combustion with flame shall come to a close within ten seconds for the first and second combustion events. The V-1 and V-2 prescriptions provide that combustion with flame shall come to a close within 30 seconds for the first and second combustion events. The sum of the time duration of the second combustion with flame and the time duration of the second combustion without flame is less than 30 seconds for the V-0 prescription, while the same sum for the V-1 and V-2 prescriptions is less than 60 seconds. The sum of the time durations of combustion with flame of the five test pieces is less than 50 seconds for the V-0 prescription, while the same sum for the V-1 and V-2 prescriptions is less than 250 seconds. The droppings of combustion are tolerated only for the V-2 prescription. That is, with the UL combustion test method (UL 94), the flame retardant properties become higher in the order of the V-0, V-1 and V-2.

Turning to the test on the appearance, the test pieces of the Examples and the Comparative Examples were exposed for 30 days in a constant temperature constant pressure vessel of 80° C. atmosphere and 80% relative humidity, and the appearance of the test pieces was checked visually. The case without changes in color was indicated with o and the case with changes in color was indicated with x.

The results of evaluation of the combustibility test and the appearance test of the Examples and the Comparative Examples are shown in the following Table 1.

TABLE 1

| | Resins to be made flame retardant (wt %) | | | | | | Flame retarder | |
|---|---|---|---|---|---|---|---|---|
| | PC | ABS | HIPS | AS | PET | PLA | Sort | Content (wt %) |
| Ex.1 | 99.8 | — | — | — | — | — | Inv. Sp.2 | 0.1 |
| Ex.2 | 84.3 | 15.0 | — | — | — | — | Inv. Sp.1 | 0.1 |
| Ex.3 | 89.2 | — | 10.0 | — | — | — | Inv. Sp.3 | 0.5 |
| Ex.4 | 89.5 | — | — | 10.0 | — | — | Inv. Sp.1 | 0.2 |
| Ex.5 | 84.0 | — | — | — | 15.0 | — | Inv. Sp.2 | 0.2 |
| Ex.6 | 48.8 | — | — | — | — | 50.0 | Inv. Sp.2 | 0.5 |
| Comp. Ex.1 | 99.8 | — | — | — | — | — | Ctl. Sp.1 | 0.1 |
| Comp. Ex.2 | 99.8 | — | — | — | — | — | Ctl. Sp.2 | 0.1 |
| Comp. Ex.3 | 99.8 | — | — | — | — | — | Ctl. Sp.3 | 0.1 |
| Comp. Ex.4 | 84.3 | 15.0 | — | — | — | — | Ctl. Sp.2 | 0.1 |
| Comp. Ex.5 | 89.2 | — | 10.0 | — | — | — | Ctl. Sp.1 | 0.5 |
| Comp. Ex.6 | 89.5 | — | — | 10.0 | — | — | Ctl. Sp.3 | 0.2 |
| Comp. Ex.7 | 84.0 | — | — | — | 15.0 | — | Ctl. Sp.2 | 0.2 |
| Comp. Ex.8 | 48.8 | — | — | — | — | 50.0 | Ctl. Sp.1 | 0.5 |

| | Flame retarder (IS) (wt %) | Anti-drip agent (wt %) | Test on combustibility (UL94) | Test on appearance after storage at high temperature |
|---|---|---|---|---|
| Ex.1 | — | 0.1 | V-0 prescription passed | o |
| Ex.2 | 0.5 | 0.1 | V-0 prescription passed | o |
| Ex.3 | — | 0.3 | V-0 prescription passed | o |
| Ex.4 | 0.1 | 0.2 | V-0 prescription passed | o |
| Ex.5 | 0.5 | 0.3 | V-0 prescription passed | o |
| Ex.6 | 0.5 | 0.2 | V-1 prescription passed | o |
| Comp. Ex.1 | — | 0.1 | V-1 prescription/not passed | o |
| Comp. Ex.2 | — | 0.1 | V-1 prescription/not passed | o |
| Comp. Ex.3 | — | 0.1 | V-0 prescription passed | x |
| Comp. Ex.4 | 0.5 | 0.1 | V-1 prescription/not passed | o |
| Comp. Ex.5 | — | 0.3 | V-1 prescription/not passed | o |

TABLE 1-continued

| | | | | |
|---|---|---|---|---|
| Comp. Ex.6 | 0.1 | 0.2 | V-0 prescription passed | x |
| Comp. Ex.7 | 0.5 | 0.3 | V-1 prescription/not passed | x |
| Comp. Ex.8 | 0.5 | 0.2 | V-2 prescription/not passed | o |

It is seen from the results of evaluation of Table 1 that the Example 1, containing acrylonitrile units in the flame retarder, is superior in flame retardant properties to the Comparative Examples 1 and 2 not containing acrylonitrile units in the flame retarder.

It is also seen from the results of evaluation of Table 1 that, in case of the Comparative Example 3, in which amide or carboxyl groups, liable to take up water, are present in the flame retarder, the flame retardant resin composition is susceptible to changes with lapse of time, on prolonged storage, such as changes in color, specifically, speckled points, indicating water take-up by the polymer, to detract from the appearance, even though flame retardant properties may be afforded to some extent to the flame retardant resin composition.

It is also seen from the results of evaluation of Table 1 that, as compared to the Comparative Examples 4 to 8, containing control samples, not conforming to the present invention, as the flame retarder, the Examples 2 to 6, containing the inventive samples as the flame retarder, represent a flame retardant resin composition in which high flame retardant properties and good appearance are achieved simultaneously.

It is seen from above that, in preparing a flame retardant resin composition, use of an acrylonitrile-styrene based polymer, in which sulfonic acid groups have been introduced by sulfonating processing with a sulfonating agent with water content less than 3 wt %, as a flame retarder, is crucial in preparing the flame retardant resin composition on which flame retardant properties have been conferred adequately such that deficiencies in appearance are not produced even on prolonged storage.

A modified embodiment of the flame retarder according to the present invention and the flame retardant resin composition containing this flame retarder will now be explained.

The flame retardant resin composition of the present embodiment is a resin material, used for example in household electrical appliances, cars, office utensil, stationeries, groceries, building materials or in fibers. The flame retarder is contained in a resin composition, which is to be made flame retardant, for conferring flame retardant properties on the composition.

The flame retarder, contained in the flame retardant resin composition, is composed of an aromatic polymer, into which preset amounts of sulfonic acid groups and/or sulfonate groups have been introduced. The aromatic polymer contains 1 mol % to 100 mol % of monomer units, each having an aromatic skeleton, and has a weight average molecular weight ranging between 25000 and 10000000 into which preset amounts of sulfonic acid groups and/or sulfonates have been introduced. The aromatic skeleton of the aromatic polymer, contained in the flame retarder, may be contained in a side chain or in the main chain of the polymer.

Specifically, the aromatic polymer, having the aromatic skeleton in its side chain, may be enumerated by, for example, polystyrene (PS), high impact polystyrene (HIPS: styrene-butadiene copolymer), an acrylonitrile-styrene copolymer (AS), an acrylonitrile-butadiene-styrene copolymer (ABS), an acrylonitrile-chlorinated polyethylene-styrene resin (ACS), an acrylonitrile-styrene-acrylate copolymer (ASA), an acrylonitrile-ethylene-propylene rubber-styrene copolymer (AES) and an acrylonitrile-ethylene-propylene-diene-styrene resin (AEPDMS). These may be used either alone or in combination.

The aromatic polymer, having an aromatic skeleton in its main chain, may be enumerated by, for example, a polycarbonate (PC), polyphenylene oxide (PPO), polyethylene terephthalate (PET), polybutylene terephthalate (PBT), and polysulfone (PSF). These may be used either alone or in combination. The aromatic polymer, having an aromatic skeleton in its main chain, may also be used as a mixture (alloy) with e.g. other resin(s). Specifically, the alloy with the other resin(s) may be enumerated by an ABS/PC alloy, a PS/PC alloy, an AS/PC alloy, an HIPS/PC alloy, a PET/PC alloy, a PBT/PC alloy, a PVC/PC alloy, a PLA (poly-lactic acid)/PC alloy, a PPO/PC alloy, a PS/PPO alloy, an HIPS/PPO alloy, an ABS/PET alloy and a PET/PBT alloy. These may be used either alone or in combination.

In the aromatic polymer, the content of the monomer units, having aromatic skeletons, is in a range from 1 mol % to 100 mol %, preferably in a range from 30 mol % to 100 mol % and more preferably in a range from 40 mol % to 100 mol %.

If the content of the monomer units, having aromatic skeletons, is less than 1 mol %, the flame retarder becomes difficult to disperse substantially evenly in the resin which should be made flame retardant, or the rate of the sulfonic acid groups or the sulfonate groups introduced into the aromatic polymer becomes lower. Hence, flame retardant properties cannot be conferred appropriately on the flame retardant resin composition.

Most typical of the aromatic skeletons, making up the aromatic polymer, are an aromatic hydrocarbon, an aromatic ester, an aromatic ether (phenols), an aromatic thioether (thiophenols), an aromatic amide, an aromatic imide, an aromatic amidimide, an aromatic ether imide, an aromatic sulfone and an aromatic ether sulfone. Of these, the aromatic ether sulfone is most illustrative, and may be exemplified by those having a ring structure, such as benzene, naphthalene, anthracene, phenathrene and coronene. Of these aromatic skeletons, a benzene ring structure or an alkylbenzene ring structure is most common.

Although not limitative, the monomer units, other than the aromatic skeleton, contained in the aromatic polymer, may be enumerated by, for example, acrylonitrile, butadiene, isoprene, pentadiene, cyclopentadiene, ethylene, propylene, butene, isobutylene, vinyl chloride, α-methylstyrene, vinyl toluene, vinyl naphthalene, acrylic acid, acrylate, methacrylic acid, methacrylate, maleic acid, fumaric acid and ethylene glycol, which may be used either alone or in combination.

The weight average molecular weight of the aromatic polymer is in a range between 25000 and 10000000, preferably in a range between 30000 and 1000000 and more preferably in a range between 50000 and 500000.

If the weight average molecular weight of the aromatic polymer deviates from 25000 and 10000000, it becomes difficult to disperse the flame retarder substantially evenly in the resin which should be made flame retardant, that is, compatibility of the polymer is lowered, with the consequence that flame retardant properties cannot be properly conferred on the flame retardant resin composition.

When the weight average molecular weight of the aromatic polymer is in the range between 25000 and 10000000, the polymer is improved in compatibility with respect to the resin which is to be rendered flame retardant, and hence the polymer may be dispersed substantially evenly in the resin. Thus, flame retardant properties may be conferred substantially evenly and properly on the flame retardant resin composition. Meanwhile, the weight average molecular weight of the aromatic polymer may readily be obtained by measurement methods, such as methods of measurement of the photometric GPC (gel permeation chromatography), employing known molecular weight samples (standard products), measurement of the viscosity of the solution or measurement of light scattering.

As the aromatic polymer, used-up redeemed materials or scraps from the plant may be used. That is, low cost may be arrived at through use of a redeemed material as a feedstock material.

The sulfonic acid groups and/or sulfonate groups may be introduced in a preset amount into the above-described aromatic polymer to give a flame retarder contained in the resin which is to be rendered flame retardant, whereby high flame retardant properties may be conferred on the resin. The method for introducing the sulfonic acid groups and/or sulfonate groups into the aromatic polymer may be exemplified by a method of sulfonating the aromatic polymer with a sulfonating agent.

The sulfonating agent, used for sulfonating the aromatic polymer, is preferably such agent containing less than 3 wt % of moisture. Specifically, the sulfonating agent is one or more selected from the group consisting of sulfuric anhydride, fuming sulfuric acid, chlorosulfonic acid and polyalkylbenzene sulfonic acid. The sulfonating agents used may also be complexes with a Lewis base of, for example, an alkyl phosphate or dioxane.

If concentrated sulfuric acid, with the water content of 96 wt %, is used as a sulfonating agent, the cyano groups in the polymer are hydrolyzed and converted to amide or carboxylic groups, having a high hygroscopic effect, at the time of sulfonating processing of the aromatic polymer for preparation of the flame retarder. Hence, the flame retarder containing these amide or carboxylic groups is prepared. If the flame retarder, containing larger quantities of the amide or carboxylic groups, is used, high flame retardant properties may be conferred on the flame retardant resin composition. There is however a fear that the moisture may be taken up from outside with lapse of time, so that the flame retardant resin composition may be discolored to detract from the appearance. Or, the flame retardant resin composition is deteriorated in physical properties. Specifically, the polystyrene sulfonate flame retarder, proposed in JP Laid-Open Patent Publication 2001-2941, belongs to this sort of the flame retarder.

In light of the above, a method consisting in adding a preset quantity of a sulfonating agent to a solution of an aromatic polymer in an organic solvent (chlorine-based solvent) to carry out reaction, may be mentioned as another method of sulfonating the aromatic polymer. There is also a method consisting in adding a preset amount of a preset sulfonating agent to a solution obtained on dispersing a pulverulent aromatic polymer in, for example an organic solvent, with the polymer not being dissolved in the solvent, in order to carry out reaction. There are furthermore a method consisting in directly charging an aromatic polymer in a sulfonating agent to carry out reaction, and a method consisting in directly spraying a sulfonating gas, specifically a gas of sulfuric anhydride ($SO_3$), to the pulverulent aromatic polymer to carry out reaction. Of these, the method consisting in directly spraying the sulfonating gas to the pulverulent aromatic polymer without using organic solvents is most preferred.

Into the acrylonitrile-styrene based polymer, the sulfonic acid groups (—$SO_3H$) or the sulfonate groups are introduced either directly or as these groups have been neutralized with ammonia or amine compounds. Specified examples of the sulfonate groups include Na, K, Li, Ca, Mg, Al, Zn, Sb and Sn salt groups of sulfonic acid.

It is noted that higher flame retardant properties may be conferred on the flame retardant resin composition when sulfonate groups, rather than the sulfonic acid groups, are introduced into the aromatic polymer. Of the sulfonate groups, the Na, K, and Ca salt groups are preferred.

The rate of the sulfonic acid groups and/or the sulfonate groups introduced into the aromatic polymer may be adjusted by the amount of addition of the sulfonating agent, the time of reaction of the sulfonating agent, reaction temperature or the kind as well as the amount of the Lewis bases. Of these, the amount of addition of the sulfonating agent, the time of reaction of the sulfonating agent and the reaction temperature are most preferred to use for adjustment.

Specifically, the rate of the sulfonic acid groups and/or the sulfonate groups introduced into the aromatic polymer as sulfur contents is 0.001 wt % to 20 wt %, preferably 0.01 wt % to 10 wt % and more preferably 0.1 wt % to 5 wt %.

In case the rate of the sulfonic acid groups and/or the sulfonate groups introduced into the aromatic polymer as sulfur contents is lower than 0.001 wt %, the flame retardant components are decreased, and hence it becomes difficult to confer flame retardant properties on the flame retardant resin composition. If conversely the rate of the sulfonic acid groups and/or the sulfonate groups introduced into the aromatic polymer as sulfur contents is more than 20 wt %, the flame retardant resin composition is susceptible to changes with lapse of time (absorption of water), or the blooming time during combustion tends to be prolonged.

The rate of the sulfonic acid groups and/or the sulfonate groups introduced into the aromatic polymer may readily be determined by quantitative analysis, by e.g. a combustion flask method, of the sulfur (S) contents in the sulfonated aromatic polymer, as an example.

The resin to be rendered flame retardant, that is, the resin which proves a feedstock material of the resin composition on which flame retardant properties are to be conferred by the above-described flame retarder contained therein, that is, the flame retardant resin composition, may be enumerated by, for example, polycarbonate (PC), an acrylonitrile-butadiene-styrene copolymer (ABS), polystyrene (PS), an acrylonitrile-styrene copolymer (AS), polyvinyl chloride (PVC), polyphenylene oxide (PPO), polyethylene terephthalate (PET), polyethylene butylate (PBT), polysulfone (PSF), thermoplastic elastomer (TPE), polybutadiene (PB), polyisoprene (PI), nitrile rubber (acrylonitrile-butadiene rubber), nylon and poly-lactic acid (PLA). These may be used either alone or in combination.

The resins to be most effectively rendered flame retardant by containing the aforementioned flame retarder may be enumerated by, for example, PC, ABS, (HI)PS, AS, PPO, PBT, PET, PVC, PLA, ABS/PC alloy, PS/PC alloy, AS/PC alloy, HIPS/PC alloy, PET/PC alloy, PBT/PC alloy, PVC/PC alloy, PLA (poly-lactic acid)/PC alloy, PPO/PC alloy, PS/PPO alloy, HIPS/PPO alloy, ABS/PET alloy and PET/PBT alloy. These may be used either alone or in combination.

Since the flame retarder used is an aromatic polymer having a weight average molecular weight ranging between 25000 and 10000000, and containing sulfonic acid groups and/or sulfonate groups, introduced therein, it is possible to proliferate the sorts of the resins which are to be made flame retardant.

As the resins to be rendered flame retardant, used-up redeemed materials or scraps from the plant may be used. That is, low cost may be arrived at through use of a redeemed material as a feedstock material.

In the above-described flame retardant resin composition, in which the aromatic polymer, having the weight average molecular weight is in a range from 25000 to 10000000, and containing a preset amount of sulfonic acid groups and/or sulfonate groups, introduced therein, is used as a flame retarder, the flame retarder may be improved in compatibility with respect to the resin to be rendered flame retardant, so that flame retardant properties may properly be conferred on the resin.

Moreover, the flame retarder, contained in the flame retardant resin composition, is obtained by sulfonating the aromatic polymer, having the weight average molecular weight in a range from 25000 to 10000000, with a sulfonating agent, having the water content less than 3 wt %, so that amide or carboxylic groups, having a high hygroscopic effect, may be suppressed from being introduced into the flame retarder. Hence, there is only little possibility of the flame retarder taking up the moisture in atmospheric air during prolonged storage becoming discolored to detract from appearance, or the flame retarder being lowered in mechanical strength.

In the present flame retardant resin composition, the content of the flame retarder is in a range from 0.0001 wt % to 30 wt %, preferably in a range from 0.001 wt % to 10 wt. % and more preferably in a range from 0.01 to 5 wt %.

In case the content of the flame retarder is less than 0.0001 wt %, it becomes difficult to confer flame retardant properties on the flame retardant resin composition. If, on the other hand, the content of the flame retarder is more than 30 wt %, a reverse effect is presented, that is, the resin composition to be rendered flame retardant is more susceptible to combustion.

That is, the present flame retarder is to be added in a minor quantity to the resin, which is to be rendered flame retardant, to yield a flame retardant resin composition on which the flame retardant properties have been conferred effectively.

In the flame retardant resin composition, described above, known flame retarders, for example, may be admixed, in addition to the aforementioned flame retarders, for further improving the flame retardant properties.

These known flame retarders may be enumerated by, for example, organic phosphate or phosphite based flame retarders, halogenated phosphate based flame retarders, inorganic phosphorus based flame retarders, halogenated bisphenol based flame retarders, halogen compound based flame retarders, antimony based flame retarders, nitrogen based flame retarders, boron based flame retarders, metal salt based flame retarders, inorganic flame retarders and silicon based flame retarders. These may be used either alone or in combination.

Specifically, the organic phosphate or phosphite based flame retarders may be enumerated by, for example, triphenyl phosphate, methyl neobenzyl phosphate, pentaerythritol diethyl diphosphate, methyl neopentyl phosphate, phenyl neopentyl phosphate, pentaerythritol diphenyl phosphate, dicyclopentyl hypodiphosphate, dineopentyl hypophosphite, phenyl pyrocatechol phosphite, ethyl pyrocatechol phosphate and dipyrocatechol hypodiphosphate. These may be used either alone or in combination.

The halogenated phosphate based flame retarders may be enumerated by, for example, tris($\beta$-chloroethyl) phosphate, tris(dichloropropyl) phosphate, tris($\beta$-bromoethyl) phosphate, tris(dibromopropyl) phosphate, tris(chloropropyl) phosphate, tris(dibromophenyl) phosphate, tris(tribromophenyl) phosphate, tris(tribromoneopentyl) phosphate, condensed polyphosphate and condensed polyphosphonate. These may be used either alone or in combination.

The inorganic phosphorus based flame retarders may be exemplified by red phosphorus and inorganic phosphates, which may be used either alone or in combination.

The halogenated bisphenol based flame retarders may be exemplified by tetrabromo bisphenol A, oligomers thereof, and bis(bromoethylether)tetrabromo bisphenol A, which may be used either alone or in combination.

The halogen compound based flame retarders may be enumerated by, for example, decabromo diphenylether, hexabromobenzene, hexabromo cyclododecane, tetrabromo phthalic anhydride, (tetrabromobisphenol) epoxy oligomers, hexabromo biphenylether, tribromophenol, dibromocresyl glycidyl ether, decabromo diphenyl oxides, halogenated polycarbonates, halogenated polycarbonate copolymers, halogenated polystyrene, halogenated polyolefin, chlorinated paraffin and perchloro cyclodecane, which may be used either alone or in combination.

The antimony based flame retarders may be enumerated by, for example, antimony trioxide, antimony tetroxide, antimony pentoxide and sodium antimonate. These may be used either alone or in combination.

The nitrogen-based flame retarders may be enumerated by, for example, melamine, alkyl group or aromatic group substituted melamine, melamine cyanurate, melamine isocyanurate, melamine phosphate, triazine, guanidine compounds, urea, various cyanuric acid derivatives, and phosphasene compounds. These may be used either alone or in combination.

The boron based flame retarders may be enumerated by, for example, zinc borate, zinc metaborate and barium metaborate. These may be used either alone or in combination.

The metal salt based flame retarders may be enumerated by, for example, alkyl metal salts or alkyl earth metal salts of perfluoroalkane sulfonic acids, alkylbenzene sulfonic acids, halogenated alkylbenzene sulfonic acids, alkylsulfonic acids and naphthalene sulfonic acid. These may be used either alone or in combination.

The inorganic flame retarders may be enumerated by, for example, magnesium hydroxide, aluminum hydroxide, barium hydroxide, calcium hydroxide, dolomite, hydrotalcite, basic magnesium carbonates, zirconium hydroxide and hydrates of inorganic metal compounds, such as hydrates of tin oxide, metal oxides, such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide and tungsten oxide, powders of metals, such as aluminum, iron, copper, nickel, titanium, manganese, tin, zinc, molybdenum, cobalt, bismuth, chromium, tungsten and antimony, and carbonates, such as zinc carbonates, magnesium carbonate, calcium carbonate and barium carbonate. These may be used either alone or in combination.

Of the inorganic flame retarders, magnesium hydroxide, aluminum hydroxide, talc, which is a hydrated magnesium silicate, basic magnesium carbonate, mica, hydrotalcite, and aluminum are preferred from the perspective of flame retardant properties and from economic considerations. Meanwhile, used-up redeemed materials or scraps from the plant may be used as the inorganic flame retarders.

The silicon-based flame retarders may be exemplified by, for example, polyorganosiloxane resins (silicone or organic silicates) and silica, which may be used either alone or as a mixture. The polyorganosiloxane resins may be enumerated by, for example, polymethylethyl siloxane resin, polydimethyl siloxane resin, polymethyl phenyl siloxane resin, polydiphenyl siloxane resin, polydiethyl siloxane resin, polyethyl phenyl siloxane resin and mixtures thereof.

The alkyl moiety portions of these polyorganosiloxane resins may contain functional groups, for example, an alkyl group, an alkoxy group, a hydroxy group, an amino group, a carboxyl group, a silanol group, a mercapto group, an epoxy group, a vinyl group, an aryloxy group, a polyoxyalkylene group, a hydroxy group or halogens. Of these, the alkyl group, alkoxy group, hydroxy group and the vinyl groups are most preferred.

The polyorganosiloxane resins are of the average molecular weight not less than 100, preferably in a range from 500 to 5000000, and are in the form of oil, varnish, gum or pellets. As for silica, it is desirably surface-processed with a silane coupling agent of a hydrocarbon compound.

The content of the known common flame retarders, given hereinabove, is usually in a range from 0.001 wt % to 50 wt %, preferably in a range from 0.01 wt % to 30 wt % and more preferably in a range from 0.1 wt % to 10 wt %, referred to the resin to be rendered flame retardant, depending on the sort of the flame retarder, the level of flame retardant properties or on the sort of the resin to be rendered flame retardant.

In the flame retardant resin composition, known routine inorganic fillers may be mixed, in addition to the above-mentioned flame retarders, for improving mechanical strength or for further improving flame retardant properties.

Among the known inorganic fillers, there are, for example, crystalline silica, fused silica, alumina, magnesia, talc, mica, kaolin, clay, diatomaceous earth, calcium silicate, titanium silicate, titanium oxide, glass fibers, calcium fluoride, calcium sulfate, barium sulfate, calcium phosphate, carbon fibers, carbon nanotubes and potassium titanate fibers. These may be used either alone or as a mixture. Of these inorganic fillers, talc, mica, carbon, glass and carbon nanotubes are most preferred.

The inorganic fillers are contained in the flame retardant resin composition in an amount in a range from 0.1 wt % to 90 wt %, preferably in a range from 0.5 wt % to 50 wt % and more preferably in a range from 1 wt % to 30 wt %.

If the content of the inorganic filler is less than 0.1 wt %, the effect of improving the toughness or the flame retardant properties of the flame retardant resin composition is lowered. If conversely the content of the inorganic filler is higher than 90 wt %, such inconveniences may arise that, in injection molding the flame retardant resin composition, the flame retardant resin composition in a molten state is lowered in fluidity or in mechanical strength.

Furthermore, in the flame retardant resin composition, fluoro olefin resins, for example, may be mixed, in addition to the above-mentioned flame retarders, for suppressing the dripping phenomenon at the time of the combustion.

Among the fluoro olefin resins, capable of suppressing the dripping phenomenon, there are, for example, a difluoroethylene polymer, a tetrafluoroethylene polymer, a tetrafluoroethylene-hexafluoropropylene copolymer and a copolymer of tetrafluoroethylene with an ethylene monomer. These may be used either alone or in combination.

Of these fluoro olefin resins, tetrafluoroethylene polymers are most preferred. The average molecular weight of the tetrafluoroethylene polymers is not less than 50000 and preferably in a range from 100000 to 20000000. Meanwhile, the fluoro olefin resins, exhibiting fibril forming properties, are more preferred.

The fluoro olefin resins are contained in a range from 0.001 wt % to 5 wt %, preferably in a range from 0.005 wt % to 2 wt % and more preferably in a range from 0.01 wt % to 0.5 wt %.

If the content of the fluoro olefin resins is less than 0.001 wt %, it becomes difficult to suppress the dripping phenomenon. If conversely the content of the fluoro olefin resins is more than 5 wt %, the effect in suppressing the dripping phenomenon becomes saturated, so that there may arise such inconveniences that the cost is elevated or the mechanical strength is lowered.

In the flame retardant resin composition, there may be added, in addition to the above-mentioned flame retardants, anti-oxidants (phenolic, phosphorus based or sulfur based anti-oxidants), anti-static agents, UV absorbers, photo-stabilizers, plasticizers, compatibility promoting agents, colorants (pigments or dyestuffs), bactericidal agents, hydrolysis inhibiting agents or surface processing agents for improving injection molding properties, shock-proofing properties, appearance, thermal resistance, weatherability or toughness.

In preparing the above-mentioned flame retardant resin composition, a flame retarder, a resin to be rendered flame retardant, and other additives, are dispersed substantially evenly in a kneader, such as a tumbler, a reblender, a mixer, an extruder or a co-kneader. The resulting product is molded by molding methods, such as injection molding, injection compression molding, extrusion molding, blow molding, vacuum molding, press molding, foam molding or supercritical molding to mold the composition in a preset shape.

The molded product, formed of the flame retardant resin composition, is used in various fields as enclosures or component parts of various products exhibiting flame retardant properties, such as household electrical appliances, cars, information equipment, office utensils, telephone sets, stationeries, furniture or fibers.

The present invention will now be described with reference to Examples and Comparative Examples for comparison to the Examples.

First, inventive samples and control samples of flame retarders, contained in the Examples and Comparative Examples, were prepared.

(Inventive Sample 4)

In preparing the inventive sample 4, 2.6 g of a styrene homopolymer, with a weight average molecular weight of 250000, as measured with photometric GPC, as an aromatic polymer, were charged into a round-bottomed flask, into which were previously charged 23.4 g of 1,2-dicycloethane. The reaction system was dissolved by heating to 50° C. to prepare a polymer solution. A liquid mixture of 0.5 g of 98% sulfuric acid and 0.6 g of acetic anhydride was dripped over ten minutes on the polymer solution. After the end of the dripping, the resulting mass was cured for four hours, by way of sulfonating the aromatic polymer. The reaction liquid was poured into boiling pure water to remove the solvent to yield a solid substance. This solid substance was rinsed thrice with lukewarm pure water and dried under reduced pressure to yield a dried solid substance.

The solid substance obtained was put to elementary analysis by a combustion flask method. The sulfur content in the so obtained flame retarder was found to be 3.9 wt %, that is, the rate of sulfonic acid introduced was 14 mol %.

The dried solid substance was neutralized with potassium hydroxide and again dried to prepare a flame retarder. That is, the inventive sample 4 is an aromatic polymer with a weight average molecular weight of 250000 into which were introduced sulfonate groups.

(Inventive Sample 5)

In preparing the inventive sample 5, a used transparent window material of an 8 mm cassette, as an aromatic polymer, was pulverized to form powders with 83 mesh pass size. 3 g of the powdered material, which is formed of an acrylonitrile-styrene copolymer resin (acrylonitrile unit: 43 mol %; styrene unit: 57 mol %), with a weight average molecular weight of 120000, as measured with photometric GPC, was charged into a round-bottomed flask. An $SO_3$ gas, evolved from 4 g of fuming sulfuric acid, was blown at room temperature over four hours into the powdered material, which was kept in an agitated state, by way of sulfonating the aromatic polymer. Air was then sent into the flask to remove residual $SO_3$ gas from the round-bottomed flask. The solid substance was washed thrice with water and subsequently dried.

The solid substance obtained was put to elementary analysis by a combustion flask method. The sulfur content in the so obtained flame retarder was found to be 2.1 wt %, that is, the rate of sulfonic acid introduced was 9.4 mol %.

The dried solid substance was then neutralized with sodium hydroxide and again dried to yield a flame retarder. That is, the inventive sample 5 is formed of an aromatic polymer, with a weight average molecular weight of 120000, into which were introduced sulfonate groups.

(Inventive Sample 6)

In the inventive sample 6, sodium polystyrene sulfonate, with a weight average molecular weight of 70000 (sulfur content: 14.1 wt %) us used as a flame retarder.

(Inventive Sample 7)

In the inventive sample 7, sodium polystyrene sulfonate, with a weight average molecular weight of 500000 (sulfur content of 13.9 wt %) was used as a flame retarder.

(Inventive Sample 8)

In the inventive sample 8, a flame retarder, formed of a white solid substance, was prepared in the same way as in the above inventive sample 5, except using powdered polycarbonate, obtained on pulverizing a redeemed MD disc from the plant, to 83 mesh pass size, as an aromatic polymer. The polycarbonate was of the weight averaged molecular weight of 31000, as measured with photometric GPC. That is, the inventive sample 8 is the aromatic polymer, with a weight averaged molecular weight of 31000, into which were introduced sulfonate groups. The sulfur content in the flame retarder, thus prepared, was measured in the same way as in the inventive sample 4. The sulfur content was found to be 0.31 wt %.

(Inventive Sample 9)

In the inventive sample 9, a flame retarder, as a brown sold substance, was prepared in the same way as in the inventive sample 5, except using powdered poly(2,6-dimethyl-p-phenylene oxide), in the powdered form, as an aromatic polymer, with a weight average molecular weight of 50000, as measured with photometric GPC. That is, the inventive sample 9 is an aromatic polymer, with a weight average molecular weight of 50000, into which were introduced sulfonate groups. The sulfur content in the flame retarder, thus prepared, was measured in the same way as in the inventive sample 4. The sulfur content was found to be 2.3 wt %.

(Control Sample 4)

In the control sample 4, a flame retarder was obtained in the same way as in the above inventive sample 4, except using polystyrene with the weight average molecular weight of 9000 as an aromatic polymer. That is, the control sample 4 is the aromatic polymer, with the weight average molecular weight of 9000, into which were introduced sulfonate groups. The sulfur content in the flame retarder, thus prepared, was measured in the same way as in the inventive sample 4. The sulfur content was found to be 4.1 wt %.

(Control Sample 5)

In the control sample 5, a flame retarder was obtained in the same way as in the above inventive sample 5, except using polystyrene with the weight average molecular weight of 20000 as an aromatic polymer. That is, the control sample 4 is the aromatic polymer, with the weight average molecular weight of 20000, into which were introduced sulfonate groups. The sulfur content in the flame retarder, thus prepared, was measured in the same way as in the inventive sample 4. The sulfur content was found to be 2.0 wt %.

(Control Sample 6)

In the control sample 6, sodium polystyrene sulfonate with the weight average molecular weight of 18000 (sulfur content: 14 wt %) was used as a flame retarder.

The inventive samples 4 to 9 and the control samples 4 to 6, obtained as described above, that is, flame retarders, were introduced into preset resin which is to be made flame retardant, to prepare Examples and Comparative Examples.

EXAMPLE 7

In the Example 7, 99.8 parts by weight of a bisphenol A polycarbonate resin, referred to below as PC, as a resin to be made flame retardant, 0.1 part by weight of the inventive sample 4, as a flame retarder, and 0.1 part by weight of fibril-forming polytetrafluoroethylene, referred to below as PTFE, as an anti-drip agent, were mixed together to form a flame retardant resin precursor. This flame retardant resin precursor was supplied to an injection molding apparatus and injection molded at a preset temperature to form a strip-shaped test piece, 1.5 mm in thickness, formed of the flame retardant resin composition.

EXAMPLE 8

In the Example 8, a strip-shaped test piece was prepared in the same way as in Example 1, except mixing 99.8 parts by weight of PC, as a resin to be made flame retardant, 0.1 part by weight of the inventive sample 5, as a flame retarder, and 0.1 part by weight of PTFE, as an anti-drip agent, to form a flame retardant resin precursor.

EXAMPLE 9

In the Example 9, a strip-shaped test piece was prepared in the same way as in Example 7, except mixing 99.4 parts by weight of PC, as a resin to be made flame retardant, 0.5 part by weight of the inventive sample 6, as a flame retarder, and 0.1 part by weight of PTFE, as an anti-drip agent, to form a flame retardant resin precursor.

EXAMPLE 10

In the Example 10, a strip-shaped test piece was prepared in the same way as in Example 7, except mixing 99.4 parts by weight of PC, as a resin to be made flame retardant, 0.5 part by weight of the inventive sample 7, as a flame retarder, and 0.1 part by weight of PTFE, as an anti-drip agent, to form a flame retardant resin precursor.

EXAMPLE 11

In the Example 11, a strip-shaped test piece was prepared in the same way as in Example 7, except mixing 99.85 parts by weight of PC, as a resin to be made flame retardant, 0.05 part by weight of the inventive sample 8, as a flame retarder, and 0.1 part by weight of PTFE, as an anti-drip agent, to form a flame retardant resin precursor.

EXAMPLE 12

In the Example 12, a strip-shaped test piece was prepared in the same way as in Example 7, except mixing 84 parts by weight of PC and 15 parts by weight of an acrylonitrile-butadiene-styrene copolymer resin, referred to below as ABS resin (weight ratio of acrylonitrile/polybutadiene/styrene=24/20/56), as resins to be made flame retardant, 0.4 part by weight of the inventive sample 5, as a flame retarder, 0.4 part by weight of polymethyl phenyl siloxane, which is a silicon-based flame retarder, referred to below as SI, as another flame retarder, and 0.2 part by weight of PTFE, as an anti-drip agent, to prepare a flame retardant resin precursor.

EXAMPLE 13

In the Example 13, a strip-shaped test piece was prepared in the same way as in Example 7, except mixing 89 parts by weight of PC and 10 parts by weight of a rubber-modified polystyrene, referred to below as HIPS resin (weight ratio of polybutadiene/styrene=10/90), as resins to be made flame retardant, 0.5 part by weight of the inventive sample 5, as a flame retarder, 0.3 part by weight of SI, as another flame retarder, and 0.2 part by weight of PTFE, as an anti-drip agent, to prepare a flame retardant resin precursor.

EXAMPLE 14

In the Example 13, a strip-shaped test piece was prepared in the same way as in Example 7, except mixing 84 parts by weight of PC and 15 parts by weight of polyethylene terephthalate, referred to below as PET, as resins to be made flame retardant, 0.4 part by weight of the inventive sample 4, as a flame retarder, 0.4 part by weight of SI, as another flame retarder, and 0.2 part by weight of PTFE, as an anti-drip agent, to prepare a flame retardant resin precursor.

EXAMPLE 15

In the Example 15, a strip-shaped test piece was prepared in the same way as in Example 7, except mixing 49 parts by weight of PC and 50 parts by weight of poly-lactic acid, referred to below as PLA, as resins to be made flame retardant, 0.3 part by weight of the inventive sample 8, as a flame retarder, 0.4 part by weight of SI, as another flame retarder, and 0.3 part by weight of PTFE, as an anti-drip agent, to prepare a flame retardant resin precursor.

EXAMPLE 16

In the Example 16, a strip-shaped test piece was prepared in the same way as in Example 7, except mixing 89 parts by weight of PC and 10 parts by weight of the HIPS resin, as resins to be made flame retardant, 0.3 part by weight of the inventive sample 9, as a flame retarder, 0.4 part by weight of SI, as another flame retarder, and 0.3 part by weight of PTFE, as an anti-drip agent, to prepare a flame retardant resin precursor.

COMPARATIVE EXAMPLE 9

In the Comparative Example 9, a strip-shaped test piece was prepared in the same way as in Example 7, except mixing 99.8 parts by weight of PC, as a resin to be made flame retardant, 0.1 part by weight of the control sample 4, as a flame retarder, and 0.1 part by weight of PTFE, as an anti-drip agent, to prepare a flame retardant resin precursor.

COMPARATIVE EXAMPLE 10

In the Comparative Example 10, a strip-shaped test piece was prepared in the same way as in Example 7, except mixing 99.8 parts by weight of PC, as a resin to be made flame retardant, 0.1 part by weight of the control sample 2, as a flame retarder, and 0.1 part by weight of PTFE, as an anti-drip agent, to prepare a flame retardant resin precursor.

COMPARATIVE EXAMPLE 11

In the Comparative Example 11, a strip-shaped test piece was prepared in the same way as in Example 1, except mixing 99.4 parts by weight of PC, as a resin to be made flame retardant, 0.5 part by weight of the control sample 6, as a flame retarder, and 0.1 part by weight of PTFE, as an anti-drip agent, to prepare a flame retardant resin precursor.

COMPARATIVE EXAMPLE 12

In the Comparative Example 12, a strip-shaped test piece was prepared in the same way as in Example 7, except mixing 84 parts by weight of PC and 15 parts by weight of an ABS resin, as resins to be made flame retardant, 0.4 part by weight of the control sample 1, as a flame retarder, 0.4 part by weight of SI, as another flame retarder, and 0.2 part by weight of PTFE, as an anti-drip agent, to prepare a flame retardant resin precursor.

COMPARATIVE EXAMPLE 13

In the Comparative Example 13, a strip-shaped test piece was prepared in the same way as in Example 7, except mixing 89 parts by weight of PC and 10 parts by weight of a HIPS resin, as resins to be made flame retardant, 0.5 part by weight of the control sample 2, as a flame retarder, 0.3 part by weight of SI, as another flame retarder, and 0.2 part by weight of PTFE, as an anti-drip agent, to prepare a flame retardant resin precursor.

COMPARATIVE EXAMPLE 14

In the Comparative Example 14, a strip-shaped test piece was prepared in the same way as in Example 7, except mixing 84 parts by weight of PC and 15 parts by weight of PET, as resins to be made flame retardant, 0.4 part by weight of the control sample 3, as a flame retarder, 0.4 part by weight of SI, as another flame retarder, and 0.2 part by weight of PTFE, as an anti-drip agent, to prepare a flame retardant resin precursor.

Then, tests on combustibility were conducted on the Examples and the Comparative Examples thus obtained.

The tests on combustibility were conducted as perpendicular combustibility tests in accordance with V-0, V-1 and V-2 prescriptions of UL 94 (Underwriters' Laboratory Subject 94). Specifically, five test pieces each of the Examples and the Comparative Examples were provided, and a burner flame was applied to each of the strip-shaped test pieces supported substantially upright. This state was maintained for ten seconds and thereafter the burner flame was separated from the test pieces. When the flame was extinguished, the burner flame was applied for further ten seconds, after which the burner flame was separated from the test pieces. Decision was given at this time on the basis of the sum of the time duration of combustion with flame after the end of the first flame contact with the test pieces, the time duration of combustion with flame after the end of the second flame contact with the test pieces, the time duration of combustion with flame after the end of the second flame contact with the test pieces, and the time duration of combustion without flame after the end of the second flame contact with the test pieces, the sum of time durations of combustion with flame of the five test pieces, and the presence/absence of the droppings of combustion. The V-0 prescription provides that combustion with flame shall come to a close within ten seconds for the first and second combustion events. The V-1 and V-2 prescriptions provide that combustion with flame shall come to a close within 30 seconds for the first and second combustion events. The sum of the time duration of the second combustion with flame and the time duration of the second combustion without flame is less than 30 seconds for the V-0 prescription, while the same sum for the V-1 and V-2 prescriptions is less than 60 seconds. The sum of the time durations of combustion with flame of the five test pieces is less than 50 seconds for the V-0 prescription, while the same sum for the V-1 and V-2 prescriptions is less than 250 seconds. The droppings of combustion are tolerated only for the V-2 prescription. That is, with the UL combustion test method (UL 94), the flame retardant properties become higher in the order of the V-0, V-1 and V-2.

In the following Table 2, the results of evaluation on tests on combustibility in the Examples and Comparative Examples are shown.

TABLE 2

| | Resins to be made flame retardant | | | | |
| --- | --- | --- | --- | --- | --- |
| | PC | ABS | HIPS | PET | PLA |
| Ex. 7 | 99.8 | — | — | — | — |
| Ex. 8 | 99.8 | — | — | — | — |
| Ex. 9 | 99.4 | — | — | — | — |
| Ex. 10 | 99.4 | — | — | — | — |
| Ex. 11 | 99.85 | — | — | — | — |
| Ex. 12 | 84.0 | 15 | — | — | — |
| Ex. 13 | 89.0 | — | 10 | — | — |
| Ex. 14 | 84.0 | — | — | 15 | — |
| Ex. 15 | 49.0 | — | — | — | 50 |
| Ex. 16 | 89.0 | — | 10 | — | — |
| Comp. Ex. 9 | 99.8 | — | — | — | — |
| Comp. Ex. 10 | 99.8 | — | — | — | — |
| Comp. Ex. 11 | 99.4 | — | — | — | — |
| Comp. Ex. 12 | 84 | 15 | — | — | — |
| Comp. Ex. 13 | 89 | — | 10 | — | — |
| Comp. Ex. 14 | 84 | — | — | 15 | — |

TABLE 2-continued

| | Flame retarder | | |
| --- | --- | --- | --- |
| | Sorts | Content (wt %) | Molecular weight of aromatic polymer |
| Ex. 7 | Inv. Sp. 4 | 0.1 | 250000 |
| Ex. 8 | Inv. Sp. 5 | 0.1 | 120000 |
| Ex. 9 | Inv. Sp. 6 | 0.5 | 70000 |
| Ex. 10 | Inv. Sp. 7 | 0.5 | 500000 |
| Ex. 11 | Inv. Sp. 8 | 0.05 | 31000 |
| Ex. 12 | Inv. Sp. 5 | 0.4 | 120000 |
| Ex. 13 | Inv. Sp. 4 | 0.5 | 250000 |
| Ex. 14 | Inv. Sp. 8 | 0.4 | 31000 |
| Ex. 15 | Inv. Sp. 5 | 0.3 | 250000 |
| Ex. 16 | Inv. Sp. 9 | 0.3 | 50000 |
| Comp. Ex. 9 | Ctr. Sp. 4 | 0.1 | 9000 |
| Comp. Ex. 10 | Ctr. Sp. 5 | 0.1 | 20000 |
| Comp. Ex. 11 | Ctr. Sp. 9 | 0.5 | 18000 |
| Comp. Ex. 12 | Ctr. Sp. 7 | 0.4 | 9000 |
| Comp. Ex. 13 | Ctr. Sp. 4 | 0.5 | 20000 |
| Comp. Ex. 14 | Ctr. Sp. 5 | 0.4 | 18000 |

| | Flame retarders (IS) (wt %) | Anti-drip agents (wt %) | Combustibility test (UL94) |
| --- | --- | --- | --- |
| Ex. 7 | — | 0.1 | V-0 prescription/passed |
| Ex. 8 | — | 0.1 | V-0 prescription/passed |
| Ex. 9 | — | 0.1 | V-0 prescription/passed |
| Ex. 10 | — | 0.1 | V-0 prescription/passed |
| Ex. 11 | — | 0.1 | V-0 prescription/passed |
| Ex. 12 | 0.4 | 0.2 | V-0 prescription/passed |
| Ex. 13 | 0.3 | 0.2 | V-0 prescription/passed |
| Ex. 14 | 0.4 | 0.2 | V-1 prescription/passed |
| Ex. 15 | 0.4 | 0.3 | V-1 prescription/passed |
| Ex. 16 | 0.4 | 0.3 | V-0 prescription/passed |
| Comp. Ex. 9 | — | 0.1 | V-1 prescription/not passed |
| Comp. Ex. 10 | — | 0.1 | V-1 prescription/not passed |
| Comp. Ex. 11 | — | 0.1 | V-1 prescription/not passed |
| Comp. Ex. 12 | 0.4 | 0.2 | V-2 prescription/not passed |
| Comp. Ex. 13 | 0.3 | 0.2 | V-2 prescription/not passed |
| Comp. Ex. 14 | 0.4 | 0.2 | V-2 prescription/not passed |

It is seen from the results of evaluation shown in Table 2 that the Examples 7 to 16, containing a flame retarder, composed of an aromatic polymer, with a weight average molecular weight in a range from 31000 to 500000, and sulfonic acid groups introduced therein, are superior in flame retardant properties to the Comparative Examples 9 to 14, containing a flame retarder, composed of an aromatic polymer, with a weight average molecular weight in a range from 9000 to 20000, and sulfonic acid groups introduced therein.

In the Comparative Examples, there were resins that were burned easily and those that were not burned easily. The reason is that, in the Comparative Examples, the flame retarder is not dispersed substantially evenly in the flame retardant resin composition, that is, that compatibility of the flame retarder in the resin to be rendered flame retardant is lowered.

Such is not the case with the Examples in which, by using a flame retarder composed of an aromatic polymer with a weight average molecular weight ranging between 31000 and 500000, and sulfonic acid groups introduced therein, the flame retarder is improved in compatibility with respect to the resin to be rendered flame retardant, and hence the flame retarder is dispersed substantially evenly in the flame retardant resin composition, so that proper flame retardant properties may be conferred on the resin to be made flame retardant.

It is also seen from the results of evaluation shown in Table 2 that, with the Examples, flame retardant properties may effectively be conferred by adding minor quantities of the flame retarder on the resin to be made flame retardant.

As may be seen from above, it is crucial, for producing a flame retardant resin composition, properly rendered flame retardant, that an aromatic polymer, with a weight average molecular weight in a range between 31000 and 500000, into which sulfonic acid groups have been introduced, shall be contained as a flame retarder in the resin to be rendered flame retardant.

Further embodiments of a flame retarder and a flame retardant resin composition, employing this flame retarder, will now be described.

Similarly to the flame retardant resin composition of the above-described embodiment, the flame retardant resin composition of the present embodiment is a resin material used e.g. for household electrical appliances, cars, office utensil, stationeries, groceries, building materials and fibers. Specifically, flame retardant properties are conferred on the resin composition, as the resin to be made flame retardant, by the flame retarder contained in the resin composition.

The flame retarder, contained in the flame retardant resin composition, is composed of an aromatic polymer, containing 1 mol % to 100 mol % of monomer units having an aromatic skeleton, and a preset quantity of sulfonic acid groups and/or sulfonate groups introduced therein. The aromatic skeleton may be present in a side chain or in a main chain of the aromatic polymer contained in the flame retarder.

Specifically, the aromatic polymer including the aromatic skeleton in its side chain may be enumerated by, for example, polystyrene (PS), high impact polystyrene (HIPS: styrene-butadiene copolymer), an acrylonitrile-styrene copolymer (AS), an acrylonitrile-butadiene-styrene copolymer (ABS), an acrylonitrile-chlorinated polyethylene resin (ACS), an acrylonitrile-styrene-acrylate copolymer (ASA), an acrylonitrile-ethylene propylene rubber-styrene copolymer (AES), and an acrylonitrile-ethylene-propylene-diene-styrene resin (AEPDMS). These may be used either alone or in combination.

The weight average molecular weight of the aromatic polymer, having the aromatic skeleton in the side chain, is in a range from 10000 to 10000000, preferably 50000 to 1000000 and more preferably 10000 to 50000.

If, in the aromatic polymer, the weight average molecular weight deviates from the range from 10000 to 10000000, it becomes difficult to disperse the flamer retarder substantially evenly in the resin to be made flame retardant. That is, the flame retarder is lowered in compatibility with respect to the resin to be made flame retardant, such that flame retardant properties cannot be conferred adequately on the flame retardant resin composition.

The aromatic polymer, having an aromatic skeleton in its main chain, may be enumerated by, for example, a polycarbonate (PC), polyphenylene oxide (PPO), polyethylene terephthalate (PET), polybutylene terephthalate (PBT), and polysulfone (PSF). These may be used either alone or in combination. The aromatic polymer, having an aromatic skeleton in its main chain, may also be used as a mixture (alloy) with e.g. other resin(s). Specifically, the alloy with the other resin(s) may be enumerated by an ABS/PC alloy, a PS/PC alloy, an AS/PC alloy, a HIPS/PC alloy, a PET/PC alloy, a PBT/PC alloy, a PVC/PC alloy, a PLA (poly-lactic acid)/PC alloy, a PPO/PC alloy, a PS/PPO alloy, a HIPS/PPO alloy, an ABS/PET alloy and a PET/PBT alloy, which may be used either alone or in combination.

In the aromatic polymer, the content of the monomer units, having aromatic skeletons, is in a range from 1 mol % to 100 mol %, preferably in a range from 30 mol % to 100 mol % and more preferably in a range from 40 mol % to 100 mol %.

If the content of the monomer units, having aromatic skeletons, is less than 1 mol %, the flame retarder becomes difficult to disperse substantially evenly in the resin, which should be made flame retardant, or the rate of the sulfonic acid groups and/or the sulfonate groups introduced into the aromatic polymer becomes lower. Hence, flame retardant properties cannot be conferred appropriately on the flame retardant resin composition.

As the aromatic skeletons, forming the aromatic polymer, aromatic hydrocarbons, aromatic esters, aromatic ethers (phenols), aromatic thioethers (thiophenols), aromatic amides, aromatic imides, aromatic amideimides, aromatic ether imides, aromatic sulfones and aromatic ether sulfones, having cyclic structures, such as benzene, naphthalene, anthracene, phenanthrene or coronene, are representative. Of these aromatic skeletons, benzene rings or alkylbenzene ring structures are most common.

The monomer units contained in the aromatic polymer, other than the aromatic skeleton, may be enumerated by, for example, acrylonitrile, butadiene, isoprene, pentadiene, cyclopentadiene, ethylene, propylene, butene, isobutylene, vinyl chloride, α-methylstyrene, vinyl toluene, vinyl naphthalene, acrylic acid, acrylates, methacrylic acid, methacrylates, maleic acid, fumaric acid and ethylene glycol, only by way of illustration. These may be used either alone or in combination.

As the aromatic polymer, used-up redeemed materials or scraps from the plant may be used. That is, low cost may be arrived at through use of a redeemed material as a feedstock material.

A flame retarder which, when contained in a preset amount in a resin to be made flame retardant, may confer high flame retardant properties on the resin, may be obtained by introducing preset amounts of sulfonic acid groups and/or sulfonates into the aromatic polymer. For introducing the sulfonic acid groups and/or sulfonates into the aromatic polymer, such a method consisting in sulfonating an aromatic polymer with a preset amount of sulfonating agents may be used.

The sulfonating agent used for sulfonating an aromatic polymer is preferably such a one containing less than 3 wt % of water. Specifically, the sulfonating agent is one or more selected from the group consisting of sulfuric anhydride, fuming sulfuric acid, chlorosulfonic acid and polyalkylbenzene sulfonic acid. As the sulfonating agent, complexes of, for example, alkyl phosphates or dioxane with Lewis bases may also be used.

If an aromatic polymer is sulfonated, with the use of 96 wt % sulfuric acid, as a sulfonating agent, to produce a flame retarder, cyano groups in a polymer are hydrolyzed and converted into highly hygroscopic amide or carboxyl groups, so that a flame retarder containing these amide or carboxyl groups is produced. If the flame retarder, containing these amide or carboxyl groups in larger quantities, is used, the moisture is taken up from outside with lapse of time, so that the flame retardant resin composition is changed in color to detract from appearance, or the resin is deteriorated in mechanical strength, even granting that high flame retardant properties may be imparted to the flame retardant resin composition. A specified example of this sort of the flame retarder is the sulfonate flame retarder proposed in, for example, the JP Laid-Open Patent Publication 2001-2941.

In light of the above, sulfonation of an aromatic polymer may be accomplished by a method consisting in adding a preset amount of a preset sulfonating agent into a solution obtained on dissolving an aromatic polymer in an organic solvent (chlorine based solvent). There is also such a method consisting in adding a preset amount of the sulfonating agent to a liquid obtained on dispersing a pulverulent acrylonitrile-styrene based polymer in an organic solvent (liquid which is not a solution) to carry out reaction. There are also such a method consisting in directly injecting an aromatic polymer into a sulfonating agent, and such a method consisting in directly spraying a sulfonating gas, specifically a gas of a sulfuric anhydride ($SO_3$), to a pulverulent acrylonitrile-styrene based polymer, to carry out reaction. Of these methods, the method consisting in directly spraying a sulfonating gas into a pulverulent aromatic polymer without employing an organic solvent is more preferred.

To the aromatic polymer are introduced the sulfonic acid groups (—$SO_3H$) or the sulfonate groups either directly or as these groups have been neutralized with ammonia or amine compounds. Specifically, the sulfonate groups may be enumerated by, for example, Specified examples of the sulfonate groups include Na, K, Li, Ca, Mg, Al, Zn, Sb and Sn salt groups of sulfonic acid.

It is noted that higher flame retardant properties may be conferred on the flame retardant resin composition when sulfonate groups, rather than the sulfonic acid groups, have been introduced into the aromatic polymer. Of these, Na salts, Ka salts and Ca salts of sulfonic acid are preferred.

The rate of the sulfonic acid groups and/or the sulfonate groups introduced into the aromatic polymer may be adjusted by the amount of addition of the sulfonating agent, the time of reaction of the sulfonating agent, reaction temperature or the kind as well as the amount of the Lewis base. Of these, the amount of addition of the sulfonating agent, the time of reaction of the sulfonating agent and the reaction temperature are most preferred to use for adjustment.

Specifically, the rate of the sulfonic acid groups and/or the sulfonate groups introduced into the aromatic polymer is 0.01 mol % to 14.9 wt %, preferably 0.05 mol % to 12 mol % and more preferably 1 mol % to 10 mol %.

In case the rate of the sulfonic acid groups and/or the sulfonate groups introduced into the aromatic polymer is lower than 0.01 mol %, it becomes difficult to confer flame retardant properties to the flame retardant resin composition. If conversely the rate of the sulfonic acid groups and/or the sulfonate groups introduced into the aromatic polymer as sulfur contents is more than 14.9 mol %, the flame retardant resin composition tends to be lowered in compatibility with respect to the resin composition, or the flame retardant resin composition tends to be deteriorated in mechanical strength with lapse of time.

The rate of the sulfonic acid groups and/or the sulfonate groups introduced into the aromatic polymer may readily be determined by quantitative analysis, by e.g. a combustion flask method, of the sulfur (S) contents in the sulfonated aromatic polymer, as an example. If the rate of the sulfonic acid groups and/or the sulfonate groups introduced into the aromatic polymer is determined on the basis of sulfur content in the aromatic polymer, the sulfur content in the aromatic polymer is normally in a range from 0.001 wt % to 4.1 wt % and preferably in a range from 0.005 wt % to 2.5 wt %, depending on for example the sort of the aromatic polymer.

The resin which is to be rendered flame retardant, as a feedstock material for the resin composition on which flame retardant properties are to be conferred by the above-described flame retarder, contained therein, that is, the flame retardant resin composition, may be enumerated by, for example, polycarbonate (PC), an acrylonitrile-butadiene-styrene copolymer (ABS), polystyrene (PS), an acrylonitrile-styrene copolymer (AS), polyvinyl chloride (PVC), polyphenylene oxide (PPO), polyethylene terephthalate (PET), polyethylene butylate (PBT), polysulfone (PSF), thermoplastic elastomer (TPE), polybutadiene (PB), polyisoprene (PI), nitrile rubber (acrylonitrile-butadiene rubber), nylon and poly-lactic acid (PLA). The resin composition contains one or more of these resins in an amount not less than 5 wt %. These may be used either alone or in combination (as alloys).

The resins to be most effectively rendered flame retardant by containing the aforementioned flame retarder may be enumerated by, for example, PC, ABS, (HI)PS, AS, PPO, PBT, PET, PVC, PLA, ABS/PC alloy, PS/PC alloy, AS/PC alloy, HIPS/PC alloy, PET/PC alloy, PBT/PC alloy, PVC/PC alloy, PLA (poly-lactic acid)/PC alloy, PPO/PC alloy, PS/PPO alloy, HIPS/PPO alloy, ABS/PET alloy and PET/PBT alloy. These may be used either alone or in combination.

By using a flame retarder composed of the aromatic polymer, into which have been introduced sulfonic acid groups or sulfonate groups in an amount in a range from 0.01 mol % to 14.9 mol %, it is possible to increase the number of the sorts of the resins to be rendered flame resistant.

As the resins to be rendered flame retardant, used-up redeemed materials or scraps from the plant may be used. That is, low cost may be arrived at through use of a redeemed material as a feedstock material.

In the above-described flame retardant resin composition, in which a flame retarder used is an aromatic polymer, into which have been introduced sulfonic acid groups or sulfonate groups in an amount in a range from 0.01 mol % to 14.9 mol %, the flame retarder may be improved in compatibility with respect to the resin to be rendered flame resistant, so that flame retardant properties may properly be conferred on the resin.

Moreover, in the above-described flame retardant resin composition, the flame retarder contained may be obtained by sulfonating the aromatic polymer with the sulfonating agent, containing less than 3 wt % of water, so that the amide or carboxyl groups, exhibiting high hygroscopic effects, may be suppressed from being introduced into the flame retarder. Consequently, there is no fear of the resin taking up the moisture in atmospheric air during prolonged storage and becoming discolored to detract from appearance or deteriorated in mechanical strength.

Furthermore, in the flame retardant resin composition, the content of the flame retarder in the resin to be made flame retardant is in a range from 0.001 wt % to 10 wt %, preferably in a range from 0.005 wt % to 5 wt % and more preferably in a range from 0.01 wt % to 3 wt %.

In case the content of the flame retarder in the resin to be rendered flame retardant is less than 0.001 wt %, it becomes difficult to confer flame retardant properties effectively on the flame retardant resin composition. If conversely the content of the flame retarder in the resin to be rendered flame retardant exceeds 10 wt %, the reverse effect is presented, that is, the flame retardant resin composition is more susceptible to combustion.

That is, the flame retardant resin composition, on which the flame retardant properties have been conferred effectively, may be obtained by adding a minor quantity of the flame retarder to the resin.

The above-described flame retardant resin composition may also be added by known routine flame retarders, in addition to the above-described flame retarders, for further improving the flame retardant properties.

These known routine flame retarders may be enumerated by, for example, organic phosphate based flame retarders, halogenated phosphate based flame retarders, inorganic phosphorus based flame retarders, halogenated bisphenol based flame retarders, halogen compound based flame retarders, antimony based flame retarders, nitrogen based flame retarders, boron based flame retarders, metal salt based flame retarders, inorganic flame retarders and silicon based flame retarders. These may be used either singly or in combination.

Specifically, the organic phosphate or phosphite based flame retarders may be enumerated by, for example, triphenyl phosphate, methyl neobenzyl phosphate, pentaerythrytol diethyl diphosphate, methyl neopentyl phosphate, phenyl neopentyl phosphate, pentaerythrytol diphenyl diphosphate, dicyclopentyl hypodiphosphate, dineopentyl hypodiphosphite, phenyl pyrocatechol phosphite, ethyl pyrocatechol phosphate and dipyrocatechol hypodiphosphate. These may be used either alone or in combination.

The halogenated phosphate based flame retarders may be enumerated by, for example, tris($\beta$-chloroethyl) phosphate, tris(dicyclopropyl) phosphate, tris($\beta$-bromoethyl) phosphate, tris(dibromopropyl) phosphate, tris(chloropropyl) phosphate, tris(dibromophenyl) phosphate, tris(tribromophenyl) phosphate, tris(tribromoneopentyl) phosphate, condensed polyphosphates and condensed polyphosphonates. These may be used either alone or in combination.

The inorganic phosphorus based flame retarder may be exemplified by, for example, red phosphorus and inorganic phosphates. These may be used either alone or in combination.

The halogenated bisphenol based flame retarder may be enumerated by, for example, tetrabromobisphenol A, oligomers thereof and bis(bromoethylether)tetrabromobisphenol A. These may be used either alone or in combination.

The halogen compound based flame retarder may be enumerated by decabromodiphenyl ether, hexabromobenzene, hexabromocyclododecane, tetrabromo phthalic anhydride, (tetrabromobisphenol) epoxy oligomer, hexabromobiphenyl ether, tribromophenol, dibromocresyl glycidyl ether, decabromodiphenyl oxide, halogenated polycarbonates, halogenated polycarbonate copolymers, halogenated polystyrene, halogenated polyolefins, chlorinated paraffins and perchlorocyclodecane. These may be used either alone or in combination.

The antimony based flame retarders may be enumerated by, for example, antimony trioxide, antimony tetroxide, antimony pentoxide and sodium antimonate. These may be used either alone or in combination.

The nitrogen-based flame retarders may be enumerated by, for example, melamine, alkyl group or aromatic group substituted melamine, melamine cyanurate, melamine isocyanurate, melamine phosphate, triazine, guanidine compounds, urea, various cyanuric acid derivatives, and phosphasene compounds. These may be used either alone or in combination.

The boron based flame retarders may be enumerated by, for example, zinc borate, zinc metaborate and barium metaborate. These may be used either alone or in combination.

The metal salt based flame retarders may be enumerated by, for example, alkyl metal salts or alkyl earth metal salts of perfluoroalkane sulfonic acids, alkylbenzene sulfonic acids, halogenated alkylbenzene sulfonic acids, alkylsulfonic acids and naphthalene sulfonic acid. These may be used either alone or in combination.

The inorganic flame retarders may be enumerated by, for example, magnesium hydroxide, aluminum hydroxide, barium hydroxide, calcium hydroxide, dolomite, hydrotalcite, basic magnesium carbonate, zirconium hydroxide, hydrates of inorganic metal compounds, such as hydrates of tin oxide, metal oxides, such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide and tungsten oxide, powders of metals, such as aluminum, iron, copper, nickel, titanium, manganese, tin, zinc, molybdenum, cobalt, bismuth, chromium, tungsten and antimony, and carbonates, such as zinc carbonates, magnesium carbonate, calcium carbonate and barium carbonate. These may be used either alone or in combination.

Of the inorganic flame retarders, magnesium hydroxide, aluminum hydroxide, talc, which is a hydrated magnesium silicate, basic magnesium carbonate, mica, hydrotalcite, and aluminum are preferred from the perspective of flame retardant properties and from economic profitability. Meanwhile, used-up redeemed materials or scraps from the plant may be used as the inorganic flame retarders.

The silicon-based flame retarders may be exemplified by, for example, polyorganosiloxane resins (silicone or organic silicates) and silica, which may be used either alone or as a mixture. The polyorganosiloxane resins may be enumerated by, for example, polymethylethyl siloxane resin, polydimethyl siloxane resin, polymethyl phenyl siloxane resin, polydiphenyl siloxane resin, polydiethyl siloxane resin, polyethyl phenyl siloxane resin and mixtures thereof.

The alkyl moiety portions of these polyorganosiloxane resins may contain functional groups, for example, an alkyl group, an alkoxy group, a hydroxy group, an amino group, a carboxyl group, a silanol group, a mercapto group, an epoxy group, a vinyl group, an aryloxy group, a polyoxyalkylene group, a hydroxy group or halogens. Of these, the alkyl group, an alkoxy group and the vinyl group are most preferred.

The polyorganosiloxane resins are of the average molecular weight not less than 100, preferably in a range from 500 to 5000000, and are in the form of oil, varnish, gum, powders or pellets. As for silica, it is desirably surface-processed with a silane coupling agent of a hydrocarbon compound.

The content of the known common flame retarders, given hereinabove, is usually in a range from 0.001 wt % to 50 wt %, preferably in a range from 0.01 wt % to 30 wt % and more preferably in a range from 0.1 wt % to 10 wt %, referred to the resin to be rendered flame retardant, depending on the sort of the flame retarder, level of flame retardant properties or on the sort of the resin to be rendered flame retardant.

In the flame retardant resin composition, known routine inorganic fillers may be mixed, in addition to the above-mentioned flame retarders, for improving mechanical strength or for further improving flame retardant properties.

Among the known inorganic fillers, there are, for example, crystalline silica, fused silica, alumina, magnesia, talc, mica, kaolin, clay, diatomaceous earth, calcium silicate, titanium silicate, titanium oxide, glass fibers, calcium fluoride, calcium sulfate, barium sulfate, calcium phosphate, carbon fibers, carbon nanotubes and potassium titanate fibers. These may be used either alone or as a mixture. Of these inorganic fillers, talc, mica, carbon, glass and carbon nanotubes are most preferred.

The inorganic fillers are contained in the flame retardant resin composition in an amount in a range from 0.1 wt % to 90 wt %, preferably in a range from 0.5 wt % to 50 wt % and more preferably in a range from 1 wt % to 30 wt %.

If the content of the inorganic filler is less than 0.1 wt %, the effect of improving the toughness or the flame retardant properties of the flame retardant resin composition is lowered. If conversely the content of the inorganic filler is higher than 90 wt %, such undesirable situation may arise that, in injection molding the flame retardant resin composition, the flame retardant resin composition in a molten state is lowered in fluidity or in mechanical strength.

Furthermore, in the flame retardant resin composition, fluoro olefin resins, for example, may be mixed, in addition to the above-mentioned flame retarders, for suppressing the dripping phenomenon that may otherwise occur during the combustion.

Among the fluoro olefin resins, capable of suppressing the dripping phenomenon, there are, for example, a difluoroethylene polymer, a tetrafluoroethylene polymer, a tetrafluoroethylene-hexafluoropropylene copolymer and a copolymer of a tetrafluoroethylene and an ethylenic monomer. These may be used either alone or in combination.

Of these fluoro olefin resins, tetrafluoroethylene polymers are most preferred. The average molecular weight of the tetrafluoroethylene polymers is not less than 50000 and preferably in a range from 100000 to 20000000. Meanwhile, the fluoro olefin resins, exhibiting fibril forming properties, are more preferred.

The fluoro olefin resins are contained in a range from 0.001 wt % to 5 wt %, preferably in a range from 0.005 wt % to 2 wt % and more preferably in a range from 0.01 wt % to 0.5 wt %, referred to the flame retardant resin composition.

If the content of the fluoro olefin resins is less than 0.001 wt %, it becomes difficult to suppress the dripping phenomenon. If conversely the content of the fluoro olefin resins is more than 5 wt %, the effect in suppressing the dripping phenomenon becomes saturated, so that there may arise inconveniences such as high cost or the inferior mechanical strength.

In the flame retardant resin composition, there may be added, in addition to the above-mentioned flame retardants, anti-oxidants (phenolic, phosphorus based or sulfur based anti-oxidants), anti-static agents, UV absorbers, photo-stabilizers, plasticizers, compatibility promoting agents, colorants (pigments or dyestuffs), bactericidal agents, hydrolysis inhibiting agents or surface processing agents for improving injection molding properties, shock-proofing properties, appearance, thermal resistance, weatherability or toughness.

In preparing the above-mentioned flame retardant resin composition, a flame retarder, a resin to be rendered flame retardant, and other additives, are dispersed substantially evenly in a kneader, such as a tumbler, a reblender, a mixer, an extruder or a co-kneader. The resulting product is molded to a preset shape by molding methods, such as injection molding, injection compression molding, extrusion molding, blow molding, vacuum molding, press molding, foam molding or supercritical molding.

The molded product, formed of the flame retardant resin composition, is used in various fields as enclosures or component parts of various products exhibiting flame retardant properties, such as household electrical appliances, cars, information equipment, office utensils, telephone sets, stationeries, furniture or fibers.

The present invention will now be described with reference to Examples and Comparative Examples for comparison to the Examples.

First, inventive samples and control samples of flame retarders, contained in the Examples and Comparative Examples, were prepared.

(Inventive Sample 10)

In preparing an inventive sample 10, 2.6 g of a styrene homopolymer (weight average molecular weight: 280000), as an aromatic polymer, were charged in a round-bottomed flask, into which were previously charged 23.4 g of 1,2-dichloroethane, for dissolution, to form a polymer solution. A liquid mixture of 0.25 g of 96% sulfuric acid and 0.3 g of sulfuric anhydride was charged dropwise into the polymer solution over ten minutes. After the end of the dripping, the resulting mass was cured for four hours, by way of sulfonating the aromatic polymer. The reaction liquid was poured into boiling pure water to remove the solvent to yield a solid substance. This solid substance was rinsed thrice with lukewarm pure water and dried under reduced pressure to yield a dried solid substance.

The flame retarder, thus prepared, was subjected to elementary analysis, using a combustion flask method. From the sulfur content in the so produced flame retarder, the rate of the sulfonic acid groups introduced was found to be 8 mol %.

The dried solid substance was neutralized with potassium hydroxide and again dried to prepare a flame retarder. In this manner, an aromatic polymer, containing the sulfonic acid groups introduced therein, was obtained as a flame retarder.

(Inventive Sample 11)

In preparing an inventive sample 11, a blade of a used-up fan was crushed, as an aromatic polymer. 3 g of an acrylonitrile-styrene copolymer resin (acrylonitrile unit: 44 mol %; styrene unit: 56 mol %) of a 83 mesh pass size, thus obtained, was charged into a round-bottomed flask, and agitated. As the resin powders were continuously stirred, an $SO_3$ gas, evolved from 4 g of fuming sulfuric acid, was blown over four hours into the powdered material, which was continuously stirred, by way of sulfonating the aromatic polymer. Air was then sent into the flask to remove residual $SO_3$ gas from the round-bottomed flask. The solid substance was washed thrice with water and subsequently dried.

The solid substance, thus prepared, was put to elementary analysis, using a combustion flask method. The introducing rate of sulfonic acid groups was found to be 7.2 mol %.

The dried solid substance was then neutralized with potassium hydroxide and again dried to yield a flame retarder in the form of a pale yellow solid substance. That is, the inventive sample 11 is again an aromatic polymer into which sulfonic acid groups have been introduced.

(Inventive Sample 12)

In an inventive sample 12, a flame retarder was obtained in the same way as in the above inventive sample 11, except using, as an aromatic polymer, an acrylonitrile-butadiene-styrene copolymer resin (acrylonitrile unit: 38 mol %; styrene unit: 50 mol %; butadiene unit: 12 mol %; color: black color), obtained on crushing a used-up 8 mm cassette to a 83 mesh pass size, and setting the time for sulfonating processing to ten minutes. That is, the inventive sample 12 is again an aromatic polymer, into which were introduced sulfonic acid groups. Similarly to the aforementioned inventive sample 12, the solid substance, prepared as described above, was put to elementary analysis, using a combustion flask method. The introducing rate of sulfonic acid groups was found to be 0.10 mol %.

(Inventive Sample 13)

In an inventive sample 13, a flame retarder in the form of a white solid substance was prepared in the same way as in inventive sample 11, except employing polyethylene terephthalate as an aromatic polymer. That is, the inventive sample 13 is again an aromatic polymer, into which were introduced sulfonic acid groups. The solid substance, thus prepared, was put to elementary analysis, in the same way as the inventive sample 10, using a combustion flask method. The introducing rate of sulfonic acid groups was found to be 0.12 mol %.

(Inventive Sample 14)

In an inventive sample 14, a flame retarder in the form of a white solid substance was prepared in the same way as in inventive sample 11, except employing powdered polycarbonate, obtained on crushing a transparent optical disc from the plant to 83 mesh pass size, as an aromatic polymer. That is, the inventive sample 14 is again an aromatic polymer, into which were introduced sulfonic acid groups. The solid substance, thus prepared, was put to elementary analysis, in the same way as the inventive sample 10, using a combustion flask method. The introducing rate of sulfonic acid groups was found to be 2 mol %.

(Inventive Sample 15)

In an inventive sample 15, a flame retarder in the form of a brown solid substance was prepared in the same way as in inventive sample 11, except employing powdered poly(2,6-dimethyl-p-phenylene oxide) as the aromatic polymer. That is, the inventive sample 15 was again an aromatic polymer, into which were introduced sulfonic acid groups. The solid substance, thus prepared, was put to elementary analysis, in the same way as the inventive sample 10, using a combustion flask method. The introducing rate of sulfonic acid groups was found to be 7.5 mol %.

(Control Sample 7)

In preparing a control sample 7, 2 g of a styrene homopolymer, used in the inventive sample 10, as an aromatic polymer, was charged in a round-bottomed flask, into which were previously charged 18 g of 1,2-dichloroethane, for dissolution, to form a polymer solution. A liquid mixture of 15 g of 1,2-dichloroethane, 0.6 g of triethyl phosphate and 2.3 g of fuming sulfuric acid was charged dropwise into the polymer solution over 1.5 hours. After the end of the dripping, the resulting mass was cured for two hours, by way of sulfonating the aromatic polymer. A deposited product was taken out, dissolved in methanol and re-precipitated in diethylether. The resulting precipitate was dried to yield a solid substance.

The solid substance, thus prepared, was subjected to elementary analysis, using a combustion flask method. The introducing rate of the sulfonic acid groups was found to be 65 mol %.

The dried solid substance was neutralized with potassium hydroxide and again dried to prepare a flame retarder. In this manner, an aromatic polymer, containing 65 mol % of the sulfonic acid groups, introduced therein, was obtained as a flame retarder.

(Control Sample 8)

In a control sample 8, sodium polystyrenesulfonate (weight average molecular weight: 18000) was used as a flame retarder. This flame retarder was subjected to elementary analysis, using a combustion flask method. The introducing rate of the sulfonic acid groups was found to be 99 mol %.

(Control Sample 9)

In the control sample 9, a flame retarder, formed of a black solid substance, was prepared in the same way as in the inventive sample 12, except employing 90 wt % of concentrated sulfuric acid, as a sulfonating agent used for sulfonating processing, and carrying out the sulfonating processing in an 80° C. atmosphere for one hour. The flame retarder, thus prepared, was put to elementary analysis by a combustion flask method, in the same way as the inventive sample 10. The introducing rate of sulfonic acid groups was 36 mol %. An aromatic polymer, containing 36 mol % of sulfonic acid groups, introduced therein, was prepared.

The inventive samples 10 to 15 and the control samples 7 to 9, that is, flame retarder samples, were introduced into a preset resin, which is to be made flame retardant, in order to prepare Examples and Comparative Examples.

EXAMPLE 17

In Example 17, 99.8 parts by weight of a polycarbonate resin (bisphenol A type), referred to below as PC, as a resin to be made flame retardant, 0.1 part by weight of the inventive sample 10, as a flame retarder, and 0.1 part by weight of fibril-forming polytetrafluoroethylene, referred to below as PTFE, as an anti-drip agent, were mixed together to prepare a flame retardant resin precursor. This flame retardant resin precursor was charged into an extruder and formed into pellets by kneading at a preset temperature. The pellets, thus formed, were charged into an injection molding apparatus, for injection molding at a preset temperature, in order to prepare a strip-shaped test piece, 1.5 mm in thickness, formed of the flame retardant resin composition.

EXAMPLE 18

In Example 18, a strip-shaped test piece was formed in the same way as in Example 17, except mixing 99.85 parts by weight of PC, as a resin to be made flame retardant, 0.05 part by weight of the inventive sample 11, as a flame retarder, and 0.1 part by weight of PTFE, as an anti-drip agent, in order to prepare a flame retardant resin precursor.

EXAMPLE 19

In Example 19, a strip-shaped test piece was formed in the same way as in Example 17, except mixing 99.85 parts by weight of PC, as a resin to be made flame retardant, 0.05 part by weight of the inventive sample 14, as a flame retarder, and 0.1 part by weight of PTFE, as an anti-drip agent, in order to prepare a flame retardant resin precursor.

EXAMPLE 20

In Example 20, a strip-shaped test piece was formed in the same way as in Example 17, except mixing 83.8 parts by weight of PC, as a resin to be made flame retardant and 15 parts by weight of an acrylonitrile-butadiene-styrene copolymer resin, with a weight ratio acrylonitrile/polybutadiene/styrene=24/20/56, referred to below as ABS resin, as another resin to be made flame retardant, 0.5 part by weight of the inventive sample 12, as a flame retarder, 0.5 part by weight of polymethyl phenyl siloxane, referred to below as SI, as a silicon-based flame retarder, used as another flame retarder, and 0.2 part by weight of PTFE, as an anti-drip agent, to prepare a flame retardant resin precursor.

EXAMPLE 21

In Example 21, a strip-shaped test piece was formed in the same way as in Example 17, except mixing 89.5 parts by weight of PC, as a resin to be made flame retardant, 10 parts by weight of rubber-modified polyethylene, with a polybutadiene/polystyrene weight ratio of 10:90, referred to below as HIPS resin, as another resin to be made flame retardant, 0.1 part by weight of the inventive sample 11, as a flame retarder, 0.2 part by weight of SI, as another flame retarder, and 0.2 part by weight of PTFE, as an anti-drip agent, in order to prepare a flame retardant resin precursor.

EXAMPLE 22

In Example 22, a strip-shaped test piece was formed in the same way as in Example 17, except mixing 89.4 parts by weight of PC, as a resin to be made flame retardant, 10 parts by weight of an acrylonitrile-styrene copolymer resin, with a weight ratio of acrylonitrile/styrene=25/75, referred to below as AS resin, as another resin to be made flame retardant, 0.2 part by weight of the inventive sample 10, as a flame retarder, 0.2 part by weight of SI, as another flame retarder, and 0.2 part by weight of PTFE, as an anti-drip agent, to prepare a flame retardant resin precursor.

EXAMPLE 23

In Example 23, a strip-shaped test piece was formed in the same way as in Example 17, except mixing 84 parts by weight of PC, as a resin to be made flame retardant, 15 parts by weight of polyethylene terephthalate, referred to below as PET, as another resin to be made flame retardant, 0.3 part by weight of the inventive sample 13, 0.4 part by weight of SI, as another flame retarder, and 0.3 part by weight of PTFE, as an anti-drip agent, in order to prepare a flame retardant resin precursor.

EXAMPLE 24

In Example 24, a strip-shaped test piece was formed in the same way as in Example 17, except mixing 49 parts by weight of PC, as a resin to be made flame retardant, 50 parts by weight of poly-lactic acid, referred to below as PLA, as another resin to be made flame retardant, 0.2 part by weight of the control sample 14, as a flame retarder, 0.5 part by weight of SI, as another flame retarder, and 0.3 part by weight of PTFE, as an anti-drip agent, in order to prepare a flame retardant resin precursor.

EXAMPLE 25

In Example 25, a strip-shaped test piece was formed in the same way as in Example 17, except mixing 99 parts by weight of ABS as a resin to be made flame retardant, 0.5 part by weight of the control sample 11, as a flame retarder, 0.2 part by weight of SI, as another resin to be made flame retardant, 0.2 part by weight of SI, as another flame retarder, and 0.3 part by weight of PTFE, as an anti-drip agent, in order to prepare a flame retardant resin precursor.

EXAMPLE 26

In Example 25, a strip-shaped test piece was formed in the same way as in Example 17, except mixing 99 parts by weight of PET as a resin to be made flame retardant, 0.5 part by weight of the control sample 13, as a flame retarder, 0.2 part by weight of SI, as another flame retarder, and 0.3 part by weight of PTFE, as an anti-drip agent, in order to prepare a flame retardant resin precursor.

EXAMPLE 27

In Example 27, a strip-shaped test piece was formed in the same way as in Example 17, except mixing 99.8 parts by weight of PC as a resin to be made flame retardant, 0.1 part by weight of the control sample 15, as a flame retarder, and 0.1 part by weight of PTFE, as an anti-drip agent, in order to prepare a flame retardant resin precursor.

COMPARATIVE EXAMPLE 15

In Comparative Example 15, a strip-shaped test piece was formed in the same way as in Example 17, except mixing 99.8 parts by weight of PC as a resin to be made flame retardant, 0.1 part by weight of the control sample 7, as a flame retarder, and 0.1 part by weight of PTFE, as an anti-drip agent, in order to prepare a flame retardant resin precursor.

COMPARATIVE EXAMPLE 16

In Control Example 16, a strip-shaped test piece was formed in the same way as in Example 17, except mixing 99.8 parts by weight of PC as a resin to be made flame retardant, 0.1 part by weight of the control sample 8, as a flame retarder, and 0.1 part by weight of PTFE, as an anti-drip agent, to prepare a flame retardant resin precursor.

COMPARATIVE EXAMPLE 17

In Control Example 17, a strip-shaped test piece was formed in the same way as in Example 17, except mixing 99.85 parts by weight of PC as a resin to be made flame retardant, 0.05 part by weight of the control sample 9, as a flame retarder, and 0.1 part by weight of PTFE, as an anti-drip agent, to prepare a flame retardant resin precursor.

COMPARATIVE EXAMPLE 18

In Control Example 18, a strip-shaped test piece was formed in the same way as in Example 17, except mixing 83.8 parts by weight of PC as a resin to be made flame retardant, 15 parts by weight of an ABS resin, as another resin to be made flame retardant, 0.5 part by weight of the control sample 9, as a flame retarder, 0.5 part by weight of SI, as another flame retarder, and 0.2 part by weight of PTFE, as an anti-drip agent, to prepare a flame retardant resin precursor.

COMPARATIVE EXAMPLE 19

In Control Example 19, a strip-shaped test piece was formed in the same way as in Example 17, except mixing 89.5 parts by weight of PC as a resin to be made flame retardant, 10 parts by weight of an HIPS resin, as another resin to be made flame retardant, 0.1 part by weight of the control sample 7, as a flame retarder, 0.2 part by weight of SI, as another flame retarder, and 0.2 part by weight of PTFE, as an anti-drip agent, to prepare a flame retardant resin precursor.

COMPARATIVE EXAMPLE 20

In Control Example 20, a strip-shaped test piece was formed in the same way as in Example 17, except mixing 89.4 parts by weight of PC as a resin to be made flame retardant, 10 parts by weight of an AS resin, as another resin to be made flame retardant, 0.2 part by weight of the control sample 8, as a flame retarder, 0.2 part by weight of SI, as another flame retarder, and 0.2 part by weight of PTFE, as an anti-drip agent, to prepare a flame retardant resin precursor.

COMPARATIVE EXAMPLE 21

In Control Example 21, a strip-shaped test piece was formed in the same way as in Example 17, except mixing 84 parts by weight of PC as a resin to be made flame retardant, 15 parts by weight of a PET resin, as another resin to be made flame retardant, 0.3 part by weight of the control sample 9, as a flame retarder, 0.4 part by weight of SI, as another flame retarder, and 0.3 part by weight of PTFE, as an anti-drip agent, to prepare a flame retardant resin precursor.

COMPARATIVE EXAMPLE 22

In Control Example 22, a strip-shaped test piece was formed in the same way as in Example 17, except mixing 49 parts by weight of PC as a resin to be made flame retardant, 50 parts by weight of a PLA resin, as another resin to be made flame retardant, 0.2 part by weight of the control sample 7, as a flame retarder, 0.5 part by weight of SI, as another flame retarder, and 0.3 part by weight of PTFE, as an anti-drip agent, to prepare a flame retardant resin precursor.

COMPARATIVE EXAMPLE 23

In Control Example 23, a strip-shaped test piece was formed in the same way as in Example 17, except mixing 99 parts by weight of ABS as a resin to be made flame retardant, 0.5 part by weight of the control sample 8, as a flame retarder, 0.2 part by weight of SI, as another flame retarder, and 0.3 part by weight of PTFE, as an anti-drip agent, to prepare a flame retardant resin precursor.

COMPARATIVE EXAMPLE 24

In Control Example 24, a strip-shaped test piece was formed in the same way as in Example 17, except mixing 99 parts by weight of PET as a resin to be made flame retardant, 0.5 part by weight of the control sample 9, as a flame retarder, 0.2 part by weight of SI, as another flame retarder, and 0.3 part by weight of PTFE, as an anti-drip agent, to prepare a flame retardant resin precursor.

The test on combustibility and the test on appearance were then carried out on the respective Examples and Comparative Examples.

The tests on combustibility were conducted as perpendicular combustibility tests in accordance with V-0, V-1 and V-2 prescriptions of UL 94 (Underwriters' Laboratory Subject 94). Specifically, five test pieces each of the Examples and the Comparative Examples were provided, and a burner flame was applied to each of the strip-shaped test pieces supported substantially upright. This state was maintained for ten seconds and thereafter the burner flame was separated from the test pieces. When the flame was extinguished, the burner flame was applied for further ten seconds, after which the burner flame was separated from the test pieces. Decision was given at this time on the basis of the sum of the time duration of combustion with flame after the end of the first flame contact with the test pieces, the time duration of combustion with flame after the end of the second flame contact with the test pieces, the time duration of combustion with flame after the end of the second flame contact with the test pieces, and the time duration of combustion without flame after the end of the second flame contact with the test pieces, the sum of time durations of combustion with flame of the five test pieces, and the presence/absence of the droppings of combustion. The V-0 prescription provides that combustion with flame shall come to a close within ten seconds for the first and second combustion events. The V-1 and V-2 prescriptions provide that combustion with flame shall come to a close within 30 seconds for the first and second combustion events. The sum of the time durations of the second combustion with flame and those without flame is less than 30 seconds for the V-0 prescription and within 60 seconds for the V-1 and V-2 prescriptions. The sum of the time durations of combustion with flame of the five test pieces is within 50 seconds for the V-0 prescription and within 250 seconds for the V-1 and V-2 prescriptions. The droppings of combustion are tolerated only for the V-2 prescription. That is, with the UL combustion test method (UL 94), the flame retardant properties become higher in the order of the V-0, V-1 and V-2.

Turning to the test on the appearance, the test pieces of the Examples and the Comparative Examples were exposed for 30 days in a constant temperature constant pressure vessel of 80° C. atmosphere and 80% relative humidity, and the appearance of the test pieces was checked visually. The case without changes in color was indicated with ○ and the case with changes in color was indicated with x.

The results of evaluation of the combustibility test and the appearance test of the Examples and the Comparative Examples are shown in the following Table 1.

TABLE 3

| | Resins to be made flame resistant (wt %) | | | | | |
|---|---|---|---|---|---|---|
| | PC | ABS | HIPS | AS | PET | PLA |
| Ex.17 | 99.8 | — | — | — | — | — |
| Ex.18 | 99.85 | — | — | — | — | — |
| Ex.19 | 99.85 | — | — | — | — | — |
| Ex.20 | 83.8 | 15.0 | — | — | — | — |
| Ex.21 | 89.5 | — | 10.0 | — | — | — |
| Ex.22 | 89.4 | — | — | 10.0 | — | — |
| Ex.23 | 84.0 | — | — | — | 15.0 | — |
| Ex.24 | 49.0 | — | — | — | — | 50.0 |
| Ex.25 | — | 99.0 | — | — | — | — |
| Ex.26 | — | — | — | — | 99.0 | — |
| Ex.27 | 99.8 | — | — | — | — | — |
| Comp. Ex.15 | 99.8 | — | — | — | — | — |
| Comp. Ex.16 | 99.8 | — | — | — | — | — |

TABLE 3-continued

| | | | | | | | |
|---|---|---|---|---|---|---|---|
| Comp. Ex.17 | 99.85 | — | — | — | — | — | — |
| Comp. Ex.18 | 83.8 | 15.0 | — | — | — | — | — |
| Comp. Ex.19 | 89.5 | — | 10.0 | — | — | — | — |
| Comp. Ex.20 | 89.4 | — | — | 10.0 | — | — | — |
| Comp. Ex.21 | 84.0 | — | — | — | — | 15.0 | — |
| Comp. Ex.22 | 49.0 | — | — | — | — | — | 50.0 |
| Comp. Ex.23 | — | 99.0 | — | — | — | — | — |
| Comp. Ex.24 | — | — | — | — | — | 99.0 | — |

| | Flame retarders | | |
|---|---|---|---|
| | sorts | Introducing rate of sulfonic acid groups (mol %) | Content (wt %) |
| Ex.17 | Inv. Sp.10 | 8.0 | 0.1 |
| Ex.18 | Inv. Sp.11 | 7.2 | 0.05 |
| Ex.19 | Inv. Sp.14 | 0.1 | 0.05 |
| Ex.20 | Inv. Sp.12 | 0.12 | 0.5 |
| Ex.21 | Inv. Sp.11 | 2.0 | 0.1 |
| Ex.22 | Inv. Sp.10 | 7.5 | 0.2 |
| Ex.23 | Inv. Sp.13 | | 0.3 |
| Ex.24 | Inv. Sp.14 | | 0.2 |
| Ex.25 | Inv. Sp.11 | | 0.5 |
| Ex.26 | Inv. Sp.13 | | 0.5 |
| Ex.27 | Inv. Sp.15 | | 0.1 |
| Comp. Ex.15 | Comp. Sp.17 | 65 | 0.1 |
| Comp. Ex.16 | Comp. Sp.18 | 99 | 0.1 |
| Comp. Ex.17 | Comp. Sp.19 | 36 | 0.05 |
| Comp. Ex.18 | Comp. Sp.9 | | 0.5 |
| Comp. Ex.19 | Comp. Sp.7 | | 0.1 |
| Comp. Ex.20 | Comp. Sp.8 | | 0.2 |
| Comp. Ex.21 | Comp. Sp.9 | | 0.3 |
| Comp. Ex.22 | Comp. Sp.7 | | 0.2 |
| Comp. Ex.23 | Comp. Sp.8 | | 0.5 |
| Comp. Ex.24 | Comp. Sp.9 | | 0.5 |

| | Combustibility (IS) (wt %) | Anti-drip agent (wt %) | Combustibility test (UL94) | Inspection on appearance following high temperature storage |
|---|---|---|---|---|
| Ex.17 | — | 0.1 | V-0 prescription passed | ○ |
| Ex.18 | — | 0.1 | V-0 prescription passed | ○ |
| Ex.19 | — | 0.1 | V-0 prescription passed | ○ |
| Ex.20 | 0.5 | 0.2 | V-0 prescription passed | ○ |
| Ex.21 | 0.2 | 0.2 | V-0 prescription passed | ○ |
| Ex.22 | 0.2 | 0.2 | V-0 prescription passed | ○ |
| Ex.23 | 0.4 | 0.3 | V-0 prescription passed | ○ |
| Ex.24 | 0.5 | 0.3 | V-1 prescription passed | ○ |
| Ex.25 | 0.2 | 0.3 | V-2 prescription passed | ○ |
| Ex.26 | 0.2 | 0.3 | V-2 prescription passed | ○ |
| Ex.27 | — | 0.1 | V-0 prescription passed | ○ |
| Comp. Ex.15 | — | 0.1 | V-0 prescription not passed | ○ |
| Comp. Ex.16 | — | 0.1 | V-1 prescription not passed | ○ |
| Comp. Ex.17 | — | 0.1 | V-1 prescription not passed | x |
| Comp. Ex.18 | 0.5 | 0.2 | V-1 prescription not passed | x |
| Comp. Ex.19 | 0.2 | 0.2 | V-0 prescription not passed | ○ |
| Comp. Ex.20 | 0.2 | 0.2 | V-2 prescription not passed | ○ |
| Comp. Ex.21 | 0.4 | 0.3 | V-1 prescription not passed | x |
| Comp. Ex.22 | 0.5 | 0.3 | V-1 prescription not passed | ○ |
| Comp. Ex.23 | 0.2 | 0.3 | V-2 prescription not passed | ○ |
| Comp. Ex.24 | 0.2 | 0.3 | V-2 prescription not passed | x |

It is seen from the results of evaluation, shown in Table 3, that the Examples 17 to 19 and 27, containing a flame retarder in such a range that the introducing rate of sulfonic acid groups into an aromatic polymer is in a range from 0.1 mol % to 8 mol %, are higher in flame retardant properties than the Comparative Examples 15 to 17, containing a flame retarder in such a range that the introducing rate of sulfonic acid groups into an aromatic polymer is in a range from 36 to 95 mol %.

The resin compositions of the Comparative Examples 15 to 17 showed variable degrees of combustibility and hence were inferior in flame retardant properties to the Examples 17 to 19 and 27.

It is also seen from the results of evaluation, shown in Table 3, that small-sized speckles of taken up moisture were generated in the flame retardant resin compositions of the Comparative Examples 17, 18, 21 and 24, containing the control sample 9 as a flame retarder, when the resin compositions were exposed to a high temperature high humidity environment, thus testifying to detects in appearance.

In the Comparative Examples 17, 18, 21 and 24, amide or carboxyl groups, liable to take up moisture, are introduced, in addition to the sulfonic acid groups, into the control sample 9, containing sulfuric acid with water content of 90 wt %. The Comparative Examples, in which the control sample 9, containing these amide or carboxyl groups, is used as a flame retarder, are liable to take up moisture.

From the results of evaluation, shown in Table 3, that the Examples 20 to 27 are improved in frame retardant properties as compared to the Comparative Examples 18 to 24.

With the Examples 20 to 27, in which the flame retarder used is low in the introducing rate of sulfonic groups, contained in the aromatic polymer, such as to provide for improved compatibility between the flame retarder and the resin to be rendered flame retardant, proper flame retardant properties may be conferred on the resin compositions.

From the results of evaluation of Table 3, it is seen that, by addition of a minor quantity of the flame retarder to the resin to be made flame retardant, flame retardant properties may effectively be conferred on the resin.

It may be seen from above that use of an aromatic polymer, in which sulfonic acid groups have been introduced in a range from 0.1 mol % to 8 mol %, as a flame retarder, in the preparation of the flame retardant resin composition, is crucial in producing a flame retardant resin composition, on which flame retardant properties have been properly conferred and which is not susceptible to defects in appearance even on prolonged storage.

Although the present invention has so far been explained with reference to the preferred embodiments, the present invention is not limited to the particular configurations of these embodiments. It will be appreciated that the present invention may encompass various changes or corrections such as may readily be arrived at by those skilled in the art within the scope and the principle of the invention.

What is claimed is:

1. A resin composition containing a flame retarder which comprises:
   an acrylonitrile-styrene copolymer containing 1 mol% to 90 mol% of styrene units, the acrylonitrile-styrene copolymer having a weight average molecular weight ranging from 20,000 to 500,000;
   sulfonate groups in all monomer units of the acrylonitrile-styrene copolymer in an amount ranging from 0.01 mol % to 8 mol % of the monomer units of the acrylonitrile-styrene copolymer; and
   a monomer ratio of a mol% content of the styrene to a mol% content of the acrylonitrile of 90/10-1/99,
   wherein,
   the resin composition has a rating of V-0 or V-1 in accordance with Underwriter Laboratories flammability testing standard UL94.

2. The resin composition according to claim 1 wherein the acrylonitrile-styrene copolymer contains at least one or more of an acrylonitrile-styrene copolymer, an acrylonitrile-butadiene-styrene copolymer, an acrylonitrile-chlorinated polyethylene-styrene copolymer, an acrylonitrile-styrene-acrylate copolymer, an acrylonitrile-ethylene-propylene rubber-styrene copolymer, an acrylonitrile-ethylene-propylene-diene-styrene copolymer.

3. The resin composition according to claim 1 wherein the sulfonating agent is one or more selected from the group consisting of sulfuric anhydride, fuming sulfuric acid, chlorosulfonic acid and polyalkylbenzene sulfonic acid.

4. The resin composition according to claim 1 wherein the acrylonitrile-styrene copolymer contains monomer units having aromatic skeletons ranging between 30 mol % and 90 mol %.

5. The resin composition according to claim 1 wherein the acrylonitrile-styrene copolymer contains monomer units having aromatic skeletons ranging between 40 mol % and 90 mol %.

6. The resin composition according to claim 1 wherein the sulfonate groups include at least one of Na, K, Li, Ca, Mg, Al, Zn, Sb, or Sn salt groups of sulfonic acid.

7. The resin composition of claim 1 having no amide groups or carboxylic groups exhibiting hygroscopicity.

8. The resin composition of claim 1, wherein the acrylonitrile-styrene copolymer contains 10 mol% to 80 mol% of acrylonitrile monomer units.

9. The flame resin composition of claim 8, wherein the acrylonitrile-styrene copolymer contains 20 mol% to 70 mol%of acrylonitrile monomer units.

10. The resin composition of claim 1, wherein the acrylonitrile-styrene copolymer contains 10 mol% to 90 mol% of styrene units.

11. The resin composition of claim 10, wherein the acrylonitrile-styrene copolymer contains 20 mol% to 80 mol% of styrene units.

* * * * *